United States Patent [19]
Bird

[11] 3,944,400
[45] Mar. 16, 1976

[54] METHOD AND APPARATUS FOR SEPARATING GASES

[75] Inventor: Graham Bird, Mission Viejo, Calif.

[73] Assignee: Petrocarbon Developments Limited, Manchester, England

[22] Filed: Apr. 7, 1975

[21] Appl. No.: 565,423

Related U.S. Application Data

[63] Continuation-in-part of Ser. No. 418,027, Nov. 23, 1973, abandoned.

[30] Foreign Application Priority Data
Mar. 12, 1974 United Kingdom............... 11000/74

[52] U.S. Cl. .......................... 55/21; 55/58; 55/62; 55/66; 55/162; 55/163; 55/179
[51] Int. Cl.² .................... B01D 15/06; B01D 53/04
[58] Field of Search ............... 55/21, 31, 32, 33, 58, 55/62, 66, 74, 75, 162, 163, 179, 389

[56] References Cited
UNITED STATES PATENTS

| | | | |
|---|---|---|---|
| 3,006,438 | 10/1961 | DeYarmett | 55/62 X |
| 3,085,379 | 4/1963 | Kiyonaga et al. | 55/58 |
| 3,176,445 | 4/1965 | Collins et al. | 55/62 X |
| 3,252,268 | 5/1966 | Stark | 55/58 X |
| 3,257,773 | 6/1966 | Conners et al. | 55/62 X |
| 3,703,068 | 11/1972 | Wagner | 55/21 |

Primary Examiner—Charles N. Hart
Assistant Examiner—Robert H. Spitzer
Attorney, Agent, or Firm—Burgess, Ryan and Wayne

[57] ABSTRACT

A method and apparatus for the separation of gases by preferential adsorption of at least one of the gases in which at least three adsorption zones are used, at least two of which are arranged in series to form the separation zone while at least one other is being regenerated for re-use in the separation zone, and in which periodically a fresh zone is added to the end of the separation section from which the product gas is recovered and the zone forming the first zone of the separation section is removed for regeneration whereby each zone is successively incorporated into the separation section and subsequently removed from it and regenerated ready for reincorporation into the separation section. Improved utilisation of adsorbent and reduced loss of product gas for regeneration purposes is thereby achieved without loss of product purity.

40 Claims, 11 Drawing Figures

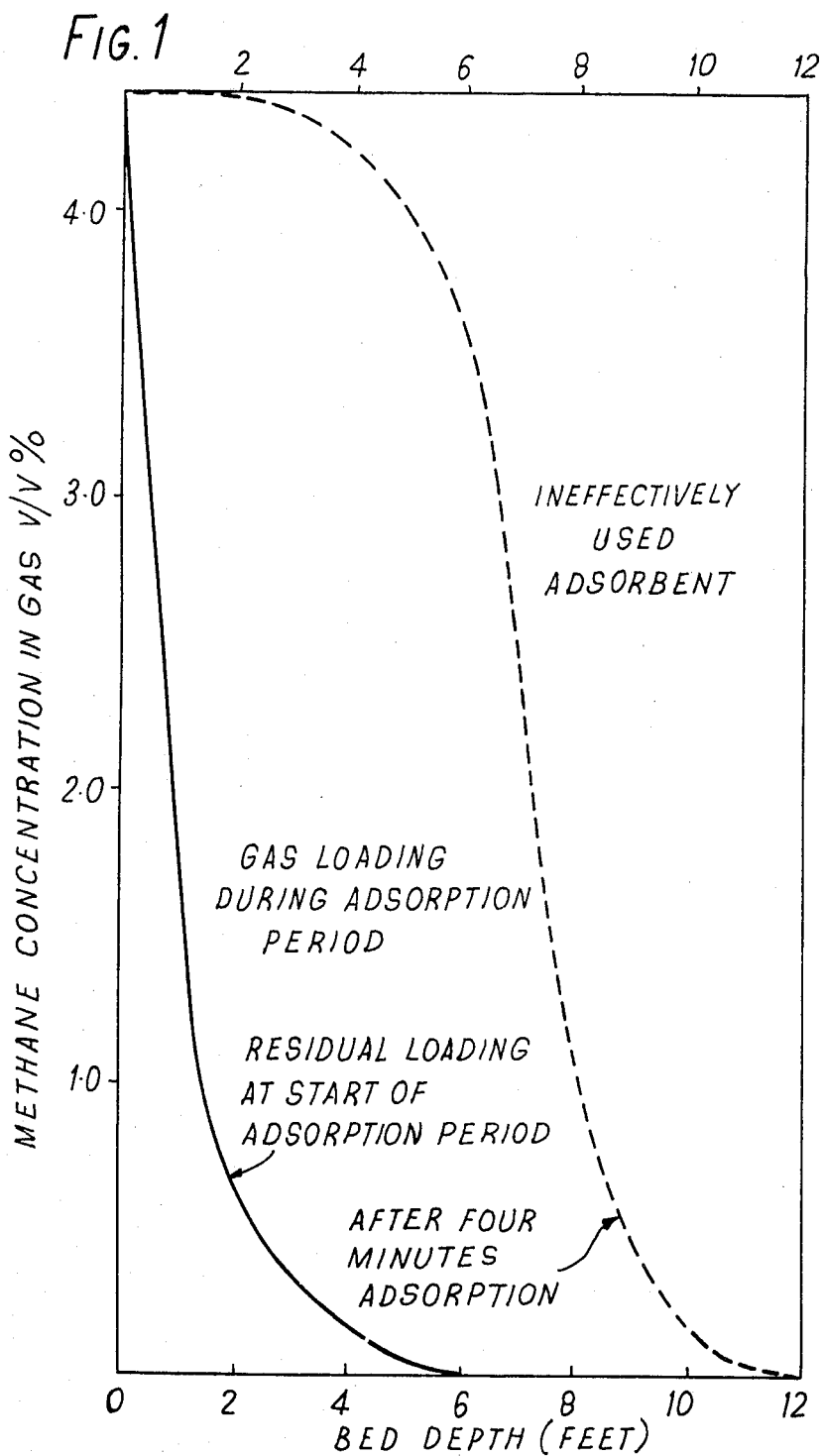

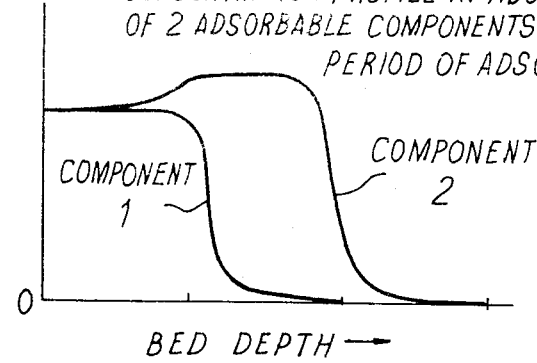
FIG. 2 CONCENTRATION PROFILE IN ADSORPTION BED OF 2 ADSORBABLE COMPONENTS AFTER A PERIOD OF ADSORPTION
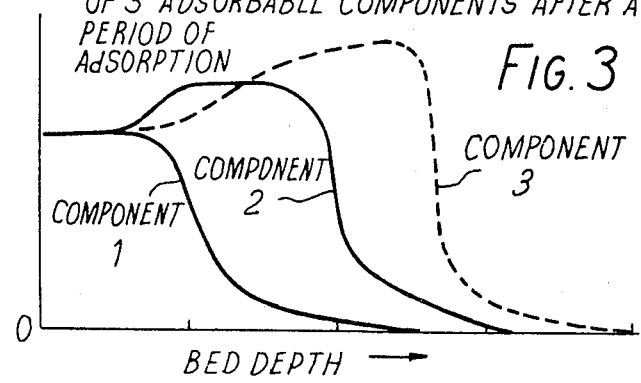
FIG. 3 CONCENTRATION PROFILE IN ADSORPTION BED OF 3 ADSORBABLE COMPONENTS AFTER A PERIOD OF ADSORPTION
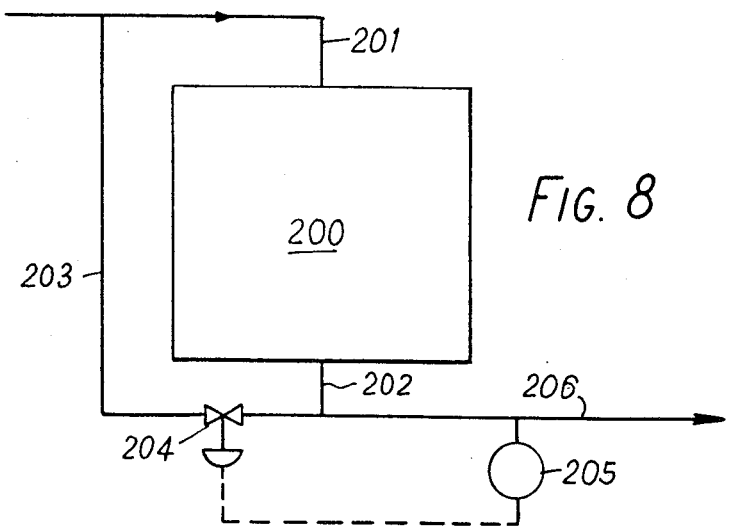
FIG. 8

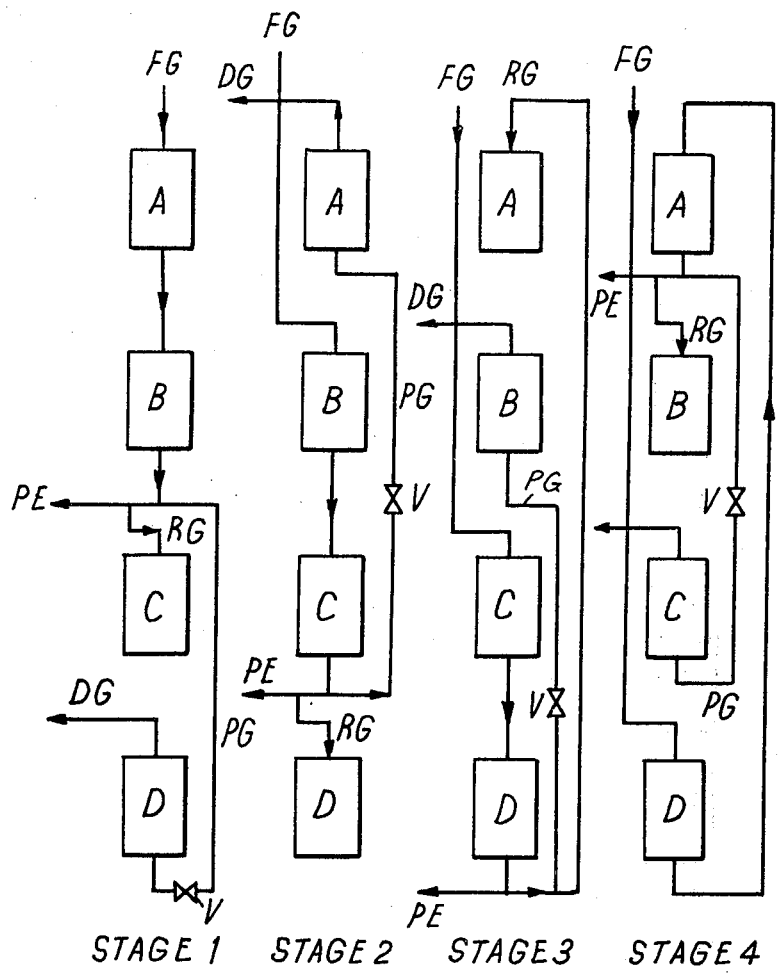

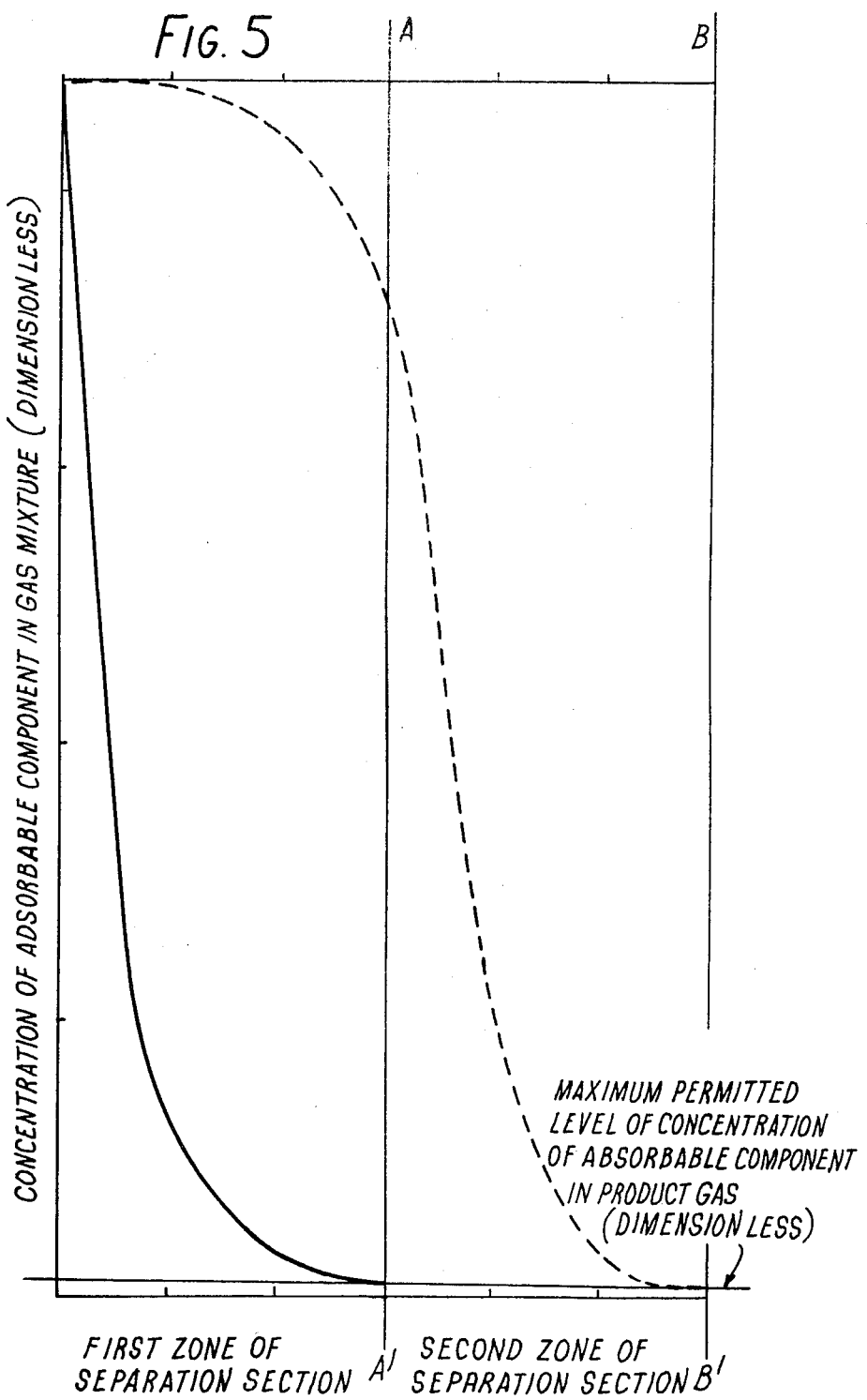

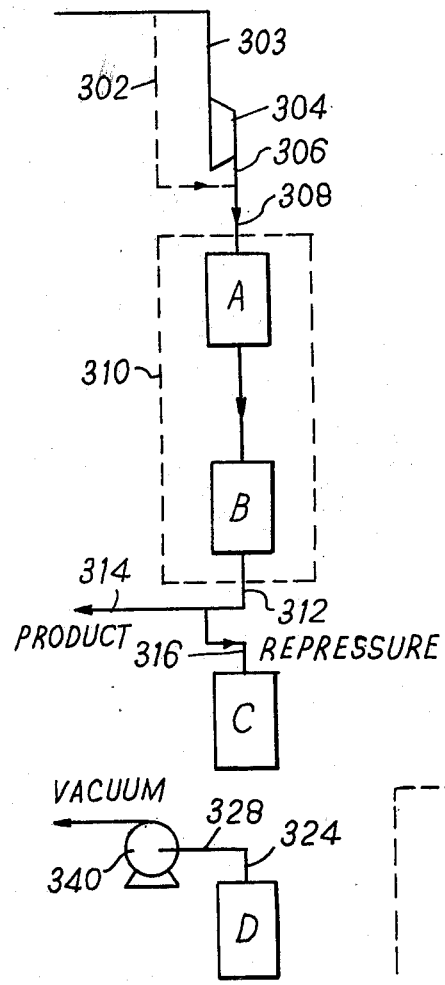
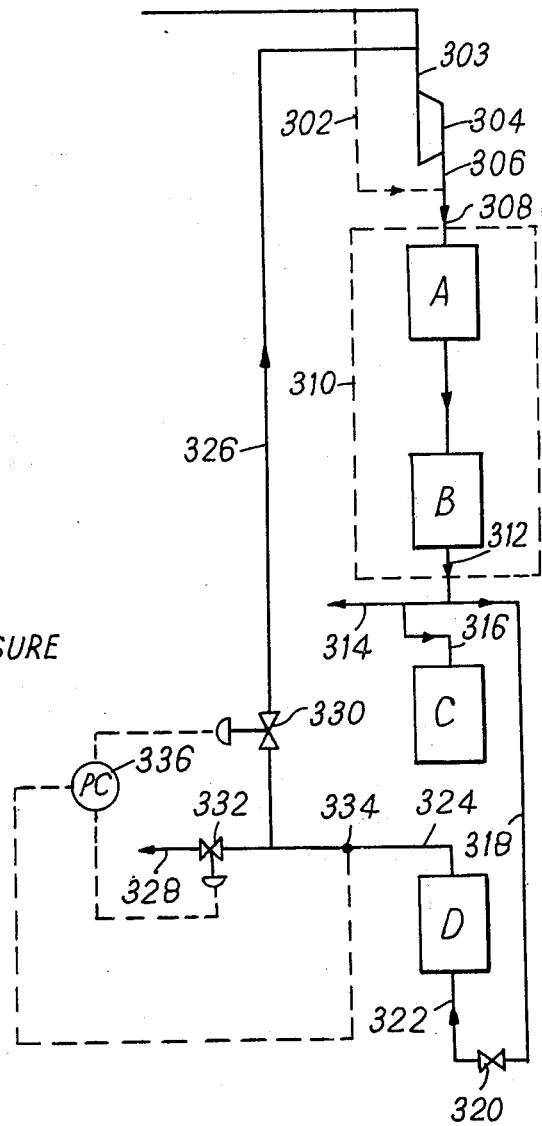
FIG. 9
FIG. 10

METHOD AND APPARATUS FOR SEPARATING GASES

This is a continuation-in-part of U.S. Pat. application Ser. No. 418,027 filed Nov. 23, 1973, now abandoned and relates to a method and apparatus for separating gas mixtures by preferential adsorption of at least one of the gases.

The pressure swing adsorption method of separating a gaseous mixture involves passing the mixture at an elevated pressure through a bed of adsorbent, usually in the form of solid particles, which is designed to be inert to one or more components of the mixture, these components generally comprising contaminants of the desired product.

After treatment of the mixture to adsorb the adsorbable component or components (contaminants) therefrom, the flow of gaseous mixture through the bed is interrupted and the bed of adsorbent is then generally regenerated for re-use by purging it of the adsorbed material by passing through the bed, generally in the opposite direction to the direction of flow taken by the gaseous mixture, a purge — or regeneration — gas stream which generally comprises a portion of the purified product at a lower pressure.

Pressure swing adsorption apparatus usually includes at least two beds of adsorbent so that while one is being purged (regenerated) at the low pressure another can be adsorbing at the elevated pressure. In some embodiments, more than two beds are used so that, for example, while one bed is adsorbing, a bed that has just completed its adsorption period is being depressurised ready for purging, a third bed is undergoing purging and a fourth bed which has just been purged is undergoing re-pressurisation prior to commencing a further period of adsorbing.

The purge or regeneration gas stream recovered from the bed of adsorbent, which will contain quantities of contaminants desorbed from the bed of adsorbent, is generally regarded as having no value other than possibly as a low grade fuel gas. Consequently it is usually vented to atmosphere or burned, depending on its constitution. Accordingly, it is desirable to reduce it as much as possible in order to achieve a high yield of purified product. It is also desirable to maximise the utilisation of the adsorbent so as to minimise the volume of adsorbent required to treat a given volume of gas mixture.

Many proposals have been put forward for achieving one or both of these objectives. In general these proposals have involved the use of as many as four or even more beds of adsorbent only one of which is utilised for separation at any one time and complicated arrangements for using the beds in rotation involving as many as eight or even more individual steps in each cycle and as many as four different gas pressures.

This invention provides a method of reducing the consumption of purge gas and hence increasing the yield of purified product. It also provides a means of reducing the amount of adsorbent required for the process and permits the recovery of the adsorbed constituents in a higher concentration in the purge stream thereby providing the possibility of upgrading the purge stream from a waste stream to a valuable by-product stream.

When a gaseous mixture is passed at an elevated pressure through a bed of adsorbent which is inert to one or more of the components which together constitute the desired product but adsorbs one or more other of the components, that portion of the bed which is close to the inlet of the gas mixture rapidly becomes saturated with adsorbate while that part of the bed which is remote from the gas inlet remains initially free of adsorbed material. As a result, the gas traversing the initial portion of the bed and which is in a condition close to equilibrium with the adsorbate will contain a relatively high concentration of the adsorbable constituents, while the gas close to the bed outlet will initially be virtually free of adsorbate. There is thus formed a saturation "front" or, in the case of several adsorbable constituents, a plurality of saturation fronts since in general these constituents will have different adsorption characteristics.

As the process of adsorption continues, so the amount of adsorbable material taken up by the bed will increase so that the front or fronts of saturation will travel towards the outlet end of the bed. After a certain time, which depends inter alia on the length of the bed, the flow rate of the gas, the concentration of adsorbable components in the gas, the mass of adsorbent and the adsorption capacity of the adsorbent, the gas leaving the bed will begin to contain appreciable amounts of one or more of the adsorbable constituent or constituents. At this point of time, or preferably just before this point of time, it is customary to interrupt the flow of gas through this bed, switch the gas flow to another bed, and beging purging the first bed with purified gas at low pressure.

The point at which the gas flow is interrupted will usually depend upon the concentration of adsorbable constituent or constituents that can be tolerated in the product gas. This in turn is generally dependent upon such factors as the use to which the product is to be put. In any event, in practice it is usual for the interruption to be effected at such a point in time as to ensure that the concentration of adsorbable constituent or constituents in the product gas does not exceed a predetermined value which may be an overall value or a value for each particular adsorbable constituent.

The point at which interruption should be effected can be determined, for example, by analysis of the product gas, e.g. by means of a katharometer. However, where the constitution of the feed gas to the bed of adsorbent can be accepted as being reasonably uniform over protracted time periods, the interruption can be effected by a time switch the setting of which can be determined by calculation from knowledge of such parameters of the process as are adumbrated above, or by empirical means.

We have now found that by operating in this way, utilisation of the bed as a whole is below optimum. This is because when the concentration of adsorbable constituent or constituents reaches the level at which interruption of the flow through the bed of adsorbent has to be effected, the total adsorption capacity of the bed has not been reached.

This is best illustrated by way of a specific example. A gas mixture containing 95.6% $H_2$ and 4.4% $CH_4$ is passed through a 12 foot long bed of type 5A molecular sieve adsorbent at a pressure of 21 atmospheres absolute and a constant temperature of 20° C. This adsorbent is inert to hydrogen but adsorbs methane. Our experiments have shown that the profiles of the methane concentration in the gas at the beginning and end of a four minute adsorption period are as shown in FIG.

1 of the attached drawings.

The curves in this Figure were obtained after a large number of alternating adsorption and regeneration periods in the course of which a state of dynamic equilibrium had established itself. The left hand, or full line curve, represents the methane concentration profile at the commencement of an adsorption period. In other words, the full line curve shows the residual methane loading in the bed after regeneration. It can be seen that at the commencement of the next adsorption period after the regeneration, the methane concentration has already been more than halved after passage through only one foot of the bed. After two feet, it is down to about 0.7% and at six feet or half way along the bed, it is substantially zero. The right hand, broken line curve, represents the methane concentration profile after four minutes of adsorption, which is when the bed is considered saturated as the methane concentration in the product stream leaving the bed is approaching a measurable value, and when the flow would be interrupted and the feed gas switched to a fresh bed of adsorbent. Since it may be assumed that the partial pressure of the methane in the gas phase is close to equilibrium with the methane adsorbed in the bed, it may be seen from this broken line curve that at the end of the adsorption period only about half the adsorbent in the bed is nearly saturated with methane at the partial pressure of the inlet gas, and about half of the adsorbent, which half includes a very large proportion of the second six feet of the bed, is far from saturation. It may therefore be seen that the bed is poorly utilised, in that it would be capable of adsorbing much more methane than it actually has adsorbed at the point at which flow of gas through the bed is interrupted.

However, if the adsorption period were to be extended in an effort to obtain better utilisation of the bed, the product gas would begin to contain undesirably large concentrations of unremoved methane.

The above example illustrates the case where one component of the feed gas mixture is adsorbed. Similar profiles are found where the adsorbent adsorbs two or more components of the feed mixture and FIGS. 2 and 3 illustrate the kind of profiles obtained with two adsorbable components and three adsorbable components, respectively. In each case it will be seen that as in the case of one adsorbable component, a large proportion of the adsorbent is still available for adsorption at the point when flow of the gas stream through the bed has to be interrupted because the level of concentration of one or more of the adsorbable constituents in the product gas leaving the bed has reached the allowable maximum.

A method of separating a gas mixture by pressure swing adsorption is now provided in accordance with the present invention, which method comprises the steps of:

a. providing an adsorption unit comprising at least three zones of adsorbent material which adsorbs at least one component of the said mixture but is inert to at least one other component of the said mixture;

b. passing the gas mixture at a first pressure through a separation section comprising at least two but less than all of the said zones, said at least two zones being arranged in series with respect to the flow of the gas mixture, and recovering from said separation section a product gas containing the adsorbable component in a much reduced concentration;

c. before the concentration of the adsorbable component in the product gas leaving the zone forming the last zone of said separation section, expressed in terms of the direction of flow of gas mixture through the separation section, rises above a predetermined value, but after the concentration of said adsorbable component in the gas stream leaving the zone forming the penultimate zone of the said separation section has exceeded said predetermined value, adding another zone of the said unit to the end of said separation section (expressed in terms of the direction of flow of the said gas mixture through the separation section) whereby this added zone now forms the last zone of the said separation section;

d. removing the zone forming the first zone from said separation section whereby the zone next to it in the separation section now becomes the first zone;

e. purging the adsorbent in said removed zone of adsorbed material by passing a purge gas through it at a second pressure which is lower than the first pressure whereby to prepare said zone for re-use in the adsorption section commencing as the last zone of said section; and f. repeating steps (c), (d) and (e) whereby each zone of said unit is successively incorporated into the separation section as the last zone thereof, is subsequently removed therefrom after it has become the first zone thereof and is thereafter purged ready for re-incorporation into the separation section.

Thus, in effect, a continuous process is provided in which less than all the available zones of the bed of adsorbent are utilised at any one time in the separation section and the section is advanced periodically zone by zone along the bed whereby the last zone in the separation section (expressed in terms of direction of flow of gas mixture through the separation section) during one separation period becomes the next to last in the next period and so on. It will thus be appreciated that the zones may be used in the separation section in rotation and that as the zones are progressed through the separation section they become progressively more saturated with material adsorbed from the gas mixture. Yet the purity of the product gas does not suffer.

By a component that is inert to the adsorbent material we mean a component that is not adsorbed or is not substantially adsorbed by the adsorbent material.

Apparatus according to the invention comprises a pressure swing adsorption unit comprising at least three compartments for adsorbent, each having a gas inlet and a gas outlet for gas to be passed through adsorbent in the compartment, each compartment forming a separately isolatable adsorption zone; an inlet for the gas mixture to be separated in said unit; and outlet for product gas and means for purging adsorbent an an adsorption zone of said unit, said adsorption unit further comprising means for connecting at least two but less than all of the said zones between the inlet for the gas mixture and the outlet for the product gas for flow of the gas mixture through said zones in series, means for periodically incorporating another zone of said unit into the separation section to form the last zone of said section (expressed in terms of the direction of flow of gas mixture through the section) whereby each zone of the unit in turn is incorporated into the separation section in successive periods, means for periodically removing from the separation section the zone forming the first zone of said section (expressed in terms of the direction of flow of gas mixture through the section), and means for connecting each zone of the unit to said purge means in a period between its period of use as said first zone in the separation section and its next period of use as the last zone in said section.

In one preferred embodiment, the pressure swing adsorption unit includes an inlet manifold connected to the inlet for the gas mixture, a product gas outlet manifold connected to the outlet for the product gas, a purge gas manifold and a waste gas manifold.

In this embodiment, each zone is equipped with first conduit means connecting the interior of the compartment to the inlet manifold for introducing the feed gas mixture into the adsorption zone and second conduit means connecting the interior of the compartment to the outlet manifold for recovering the product gas. These conduit means will normally connect with opposite ends of the compartment and are equipped with inlet and outlet valves, respectively, so that each zone has separate means for connection to the inlet and outlet manifolds.

Each zone is also equipped with third conduit means connecting the interior of one end of the compartment to the purge gas manifold for permitting entry of purge gas into the adsorption zone and fourth conduit means connecting the interior of the compartment to the waste gas manifold for withdrawing from the adsorption zone the desorbed components which will be entrained in the purge gas. These third and fourth conduit means will normally connect with opposite ends of the compartment and in general, though not necessarily, will be arranged so that the flow of the purge gas through the adsorption zone is in the opposite direction to the flow of the gas mixture through the zone during adsorption. The third and fourth conduit means are equipped with purge gas inlet and waste gas outlet valves respectively whereby each zone may be separately connected to the purge and waste gas manifolds.

Each zone is also connected to one other zone by fifth conduit means so that the zones may be connected together for flow of gas mixture therethrough in series, there being a valve between the outlet of each zone and the inlet to the next zone.

Suitably each zone's inlet for the gas mixture may also comprise the outlet for the waste gas and each zone's outlet for the product gas may comprise the inlet for the purge gas.

The valves may be electrically, hydraulically or pneumatically operated and operation of the unit may be effected automatically e.g. by means of a time clock.

In one method of carrying out the invention using $x$ zones of adsorbent where $x$ is a whole number equal to or greater than 3, the section used for separation may be considered as containing $y$ zones where $y$ is a whole number of at least 2 but not greater than $x-1$. Assuming that the zone forming the first zone of the separation section is removed from the separation section simultaneously with the addition of the further zone to the end of the separation section, the total duration of any zone in the separation section will then be y periods and the elapsed time between consecutive uses of the zone in the separation section will be $x-y$ periods. Although for simplicity of the operation of the system it is preferred that the zone forming the first zone of the separation section is removed from the separation section simultaneously with the addition of the further zone to the end of the separation section, this is not essential to the invention. Ideally, it would be preferred that the removal from the separation section of the zone forming the first zone thereof is effected when its capacity to adsorb components from the gas mixture has been substantially fully utilised and this may occur before or after the addition of the first zone. Thus, in this case, it may be preferred that removal is effected when the concentration of the or an adsorbable component in the gas stream leaving said zone reaches a second predetermined value, this value preferably being not much less than the level of concentration of adsorbent in the gas mixture being fed to the separation section since this is an indication that the adsorbent in the zone is substantially fully saturated with the adsorbable component. However, it is expected that the needs of operational simplicity will generally outweigh the desire to achieve theoretically ideal arrangement so that removal of the first zone and addition of the further zone will usually be effected substantially simultaneously.

In the interval between the period in which a zone forms the first zone in a separation section and the period in which the same zone is re-incorporated into the separation section as the last zone thereof, the said zone has to be treated to remove the adsorbed material and this treatment generally involves depressurisation of the zone to reduce the pressure to that required for purging, and, subsequent to purging, repressurisation to the separation pressure. Where the removal of the first zone and addition of the further zone are effected simultaneously, this interval amounts to $x-y$ periods. Thus where the total number of zones available is three and two are used in the separation section, this interval equals one period. It is accordingly preferred to use at least four zones of adsorbent, the arrangement being that in each period of the cycle of use of the unit all but two of the zones are used in series in the separation section while one of the remaining zones is being depressurised and purged and the other is being re-pressurised.

If at least five zones are used, and all but three of the zones are utilised in the separation section, the steps of depressurising and purging may be split so that while one of the remaining zones is being depressurised, another may be purged and the remaining one may be re-pressurised.

In one preferred arrangement, four zones are provided whereby in each period of the cycle two are used in the separation section, another is being depressurised and purged and the fourth is being re-pressurised. In such arrangement, each zone in turn is successively the second (last) zone in the series of two comprising the separation section, then the first, then is depressurised and purged, and then is re-pressurised ready for re-use in the separation section, whereby two periods are available for depressurisation, purging and re-pressurisation.

Where the first zone is not removed until after the further zone is added, the period available for depressurisation, purging and re-pressurisation will be less, and where it is removed before the further zone is added, the period will be more.

If five zones are used, the depressurisation and purging may be separated so that while two zones are forming the separation section, a third may be undergoing depressurisation prior to purging a fourth may be purged and the fifth may be undergoing re-pressurisation prior to re-use in the separation section. Alternatively, three or even four zones may form the separation section. With six zones, further possibilities are available with up to four or even five zones forming the separation section.

Where the gas mixture contains two or more components that are adsorbed by the adsorbent, it may be desirable for the separation section to contain more than two zones; for example, if $n$ is the number of components that are adsorbed, $n + 1$ zones are preferably provided in the separation section.

Frequently, the most readily available, or only immediately available source of purge gas for regenerating the zones of adsorbent removed from the separation section is the product gas. In this case, a portion of the product gas is separated from the remainder, reduced in pressure to the pressure used for purging, and used as the purge gas. Generally, the greater the pressure difference between the separation pressure and the purge pressure, the smaller the quantity of purge gas is required and hence the more efficient the process in terms of net product.

In the method of the invention, each zone remains as a part of the separation section until after the concentration of adsorbable component in the gas leaving the zone has risen beyond the predetermined maximum allowable value in the product gas and therefore the adsorbent in said zone is more fully utilised than in conventional processes. In the preferred operation of the invention, the zone is not removed from the separation section until the adsorbent is substantially saturated. Thus, less adsorbent is required to treat a given volume of gas. Furthermore, since the adsorbent is more fully utilised, less product gas remains in the adsorbent when the zone is removed from the separation section and consequently less product gas is lost through purging.

Where the flow of gas mixture through a bed of adsorbent is interrupted before the adsorbent has been fully utilised, gas corresponding in composition to product gas remains in the bed. This gas is lost during purging and therefore represents a further loss of product. In the present invention, this loss is reduced and in the preferred method of operation can be substantially eliminated.

A further advantage is that as the adsorbent in each zone is more fully utilised than in conventional methods, the partial pressure of the adsorbed material in the zone when it is removed from the separation section is higher and hence relatively less purge gas is required to remove it, thus resulting in a further increase in net product. This also leads to the purge gas which is recovered from the adsorbent having a higher concentration of material desorbed from the adsorbent and therefore being more likely to be of value in itself as a usable gas stream than heretofore.

In conventional processes, in which one bed of adsorbent is provided in the separation zone while other beds are being subjected to depressurisation, purging and re-pressurisation, it will be recognised that not more than 50% of the available mass of adsorbent can be used for separation at any given time; and in many instances the value is as low as 25 or even 20%. With the present invention, however, it is possible to utilise more than 50%. Thus, for example, where three zones are used, two of which form the separation section, the figure is 66.2/3%. Thus the invention can if desired provide means for processing larger quantities of gas with a given mass of adsorbent or alternatively means for processing the same quantity of gas with a smaller mass of adsorbent.

Only two pressures are required in the process of the invention; the separation pressure and the purging or regeneration pressure. By way of comparison, in several prior proposals for increasing the efficiency of pressure swing adsorption processes, three or more, e.g., up to five pressure levels are required.

Where each zone of adsorbent is re-pressurised prior to being incorporated into the separation section, the product gas may be recovered from the system at substantially constant pressure, thus obviating the need to pass the product gas to an accumulator vessel or surge tank where pressure fluctuations can be smoothed out. Furthermore, with constant feed conditions there is little or no variation in the rate of flow of the product.

It will be appreciated that as the gas mixture to be separated flows through a separation section comprising a given set of zones of adsorbent, the concentration of the adsorbable components in the product gas will tend to rise with the passage of time until it reaches the level at which, e.g., by means of a time switch or a device operated by a gas analyser, the next zone is added to the separation section, at which point, the concentration of the adsorbable component will fall again. The composition of the product gas will thus tend to fluctuate to a certain extent although generally witin narrow limits. Where such fluctuation is not acceptable in the product gas, a more steady product composition may be achieved by arranging for the above-mentioned pre-determined maximum allowable value of concentration of adsorbable component in the gas leaving the last zone of the separation section to be below the maximum value that can be tolerated in the product gas, arranging for a part of the feed gas to the separation section to by-pass this section and be combined with the product gas recovered from the separation section to form a combined stream, and controlling the rate of flow of the feed gas in the by-pass relative to the flow rate of the product gas so as to maintain the composition of the combined stream constant. This may be achieved automatically, for example, by sensing any difference between the measured partial pressure of a component in the combined gas stream and a pre-determined value for said partial pressure, and adjusting the rate of flow of the gas in the by-pass in response to said sensed difference to alter the measured partial pressure of the component towards said predetermined partial pressure.

Uses for which the invention is applicable include, for example, purification of gases, separation of a desired gas or gas composition from a mixture thereof with one or more other gases or vapours, reclamation of gases from contaminated gas streams, and life support systems. By way of specific example may be mentioned the recovery of methane from natural gas, the purification of ammonia from synthesis gases, the reclamation of helium used in life support systems in diving operations and the removal of contaminants such as carbon dioxide and moisture from air in life support systems.

The nature of the adsorbent material utilised in the adsorption zones will depend upon the composition of the gas mixture to be treated and the nature of the components which are to be adsorbed. Examples of suitable adsorbents are activated charcoal and molecular sieves e.g. synthetic zeolites. As is well known in the art, a wide variety of such adsorbents is now available, these adsorbents being single materials or mixtures designed with specific adsorption purposes in mind.

The invention is now described in more detail with reference to particular embodiments thereof and with the aid of the accompanying drawings, in which FIG. 1 illustrates the concentration profile of the adsorbable component in a prior art gas separation process;

FIG. 2 illustrates the concentration profile of two adsorbable components in a prior art gas separation process;

FIG. 3 illustrates the concentration profile of three adsorbable components in a prior art gas separation process;

FIG. 4 is a schematic representation of a method of operating the invention with four zones of adsorbent in a pressure swing adsorption unit;

FIG. 5 shows the concentration profile of adsorbable component in the two zones forming the separation section of the adsorption unit of FIG. 4 at the end of an operating stage;

FIG. 8 illustrates a further embodiment of the invention adapted to reduce the fluctuation of level of concentration of adsorbable components in the product gas;

FIG. 9 shows a modification of the four-zone arrangement shown in STAGE 1 of FIG. 4 wherein regeneration of the adsorbent is effected by evacuation;

FIG. 10 shows another modification of the four-zone arrangement shown in STAGE 1 of FIG. 4 wherein provision is made for recycling gas recovered from each zone during regeneration of the adsorbent therein.

Figure 6:
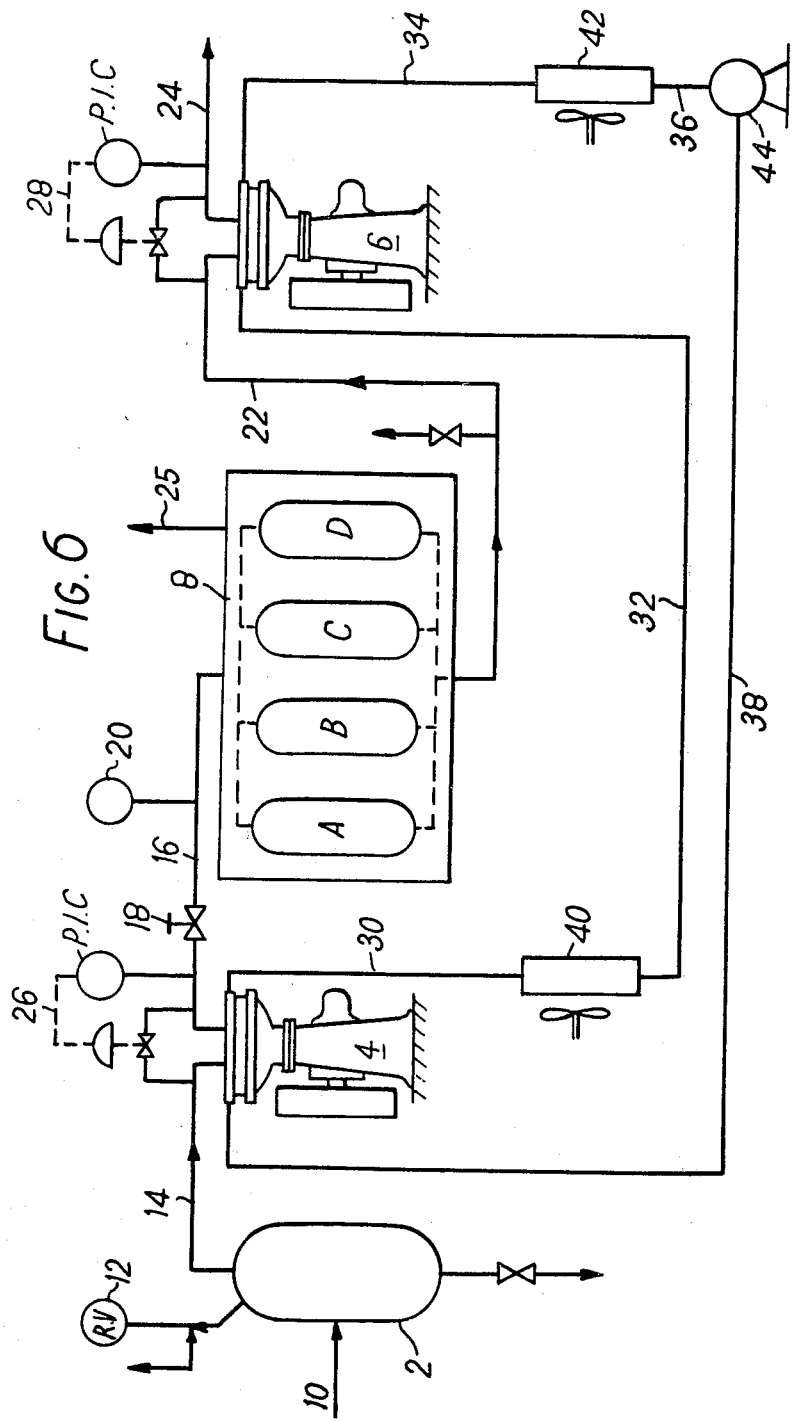
FIG. 6 represents a helium recovery plant including a pressure swing adsorption unit according to the invention having four zones of adsorbent.

Referring to FIG. 4, the pressure swing adsorption unit comprises four zones of adsorbent A, B, C and D. During the first stage (STAGE 1 in the drawing), the compressed gaseous mixture FG to be separated, which for the purposes of simplicity is regarded as containing one component that is adsorbed by the adsorbent, is passed through a separation section comprising zones A and B in series and a purified product gas PE is recovered. During this same period, zone C, which has previously been purged at low pressure, is re-pressurised with repressurisation gas RG which is taken from the stream of purified product PE leaving zone B, and zone D is depressurised and purge by passing through it in the opposite direction to that of the compressed gas flow a purge gas PG which comprises a further portion of the purified gas from B which has been expanded through valve V to a lower pressure. The gas DG carrying the material desorbed from zone D is removed from the system as shown.

At the point in time when the concentration of the adsorbable component of the feed gas mixture FG is detected as having reached a predetermined level in the product gas PE leaving zone B, this level being usually the maximum permitted level of the adsorbable component in the product gas, or after a predetermined period of time has elapsed which is determined by empirical means or calculated from available data to correspond to this point in time, the profile of concentration of the adsorbable component in the two zones A and B will correspond to that shown by the broken curve in FIG. 5, in which the vertical line AA' corresponds to the outlet end of zone A and the vertical line BB' corresponds to the outlet end of zone B. Thus zone A is substantially fully saturated with adsorbable material while zone B has been utilised only to about 20%.

In accordance with the invention, at this point in time, zone C, which has previously been purged and re-pressurised to the pressure of the feed gas mixture, is added to the separation section to form the last zone thereof (expressed with reference to the direction of flow of the feed gas mixture through the separation section) and zone A, which during STAGE 1 formed the first zone of the separation section (expressed with reference to the direction of flow of the feed gas mixture through the separation section), is removed from the separation section and commences depressurisation and purging. Thus zone B now becomes the first zone of the separation section and zone C becomes the second or last zone. At the same time zone D, which during STAGE 1 has been undergoing depressurisation and purging, commences re-pressurisation.

The situation is then as shown in STAGE 2 of FIG. 4, with the feed gas mixture FG being passed through a separation section comprising zones B and C in that order, zone D being re-pressurised with a portion RG of the product gas and zone A being depressurised and purged with purge gas PG. As the zone C has been previously purged, the profile of concentration of adsorbable component in the two zones B and C will now correspond to that shown by the continuous curve in FIG. 5, with the line AA' now indicating the outlet end of zone B and the line BB' indicating the outlet end of zone C. The concentration of adsorbable component in the product gas leaving the separation section will thus fall away.

When the point in time is reached when the concentration of the adsorbable component of the feed gas mixture FG is detected as having again reached the aforementioned predetermined level in the product gas (or when a further period of time has elapsed corresponding to reaching this point in time) the profile of concentration of the adsorbable component in the two zones B and C will now correspond to that shown by the broken line in FIG. 5, with the lines AA' and BB' indicating the outlet ends of zones B and C respectively. Thus zone B is now substantially fully saturated while zone C is only partly saturated. In accordance with the invention, at this point in time, previously purged and re-pressurised zone D is now added to the separation section as the last zone thereof and zone B is removed and commences depressurisation and purging. Thus zone C now becomes the first zone of the separation section and zone D becomes the second (or last) zone. At the same time, zone A which during STAGE 2 has been undergoing depressurisation and purging, commences re-pressurisation.

The situation is then as shown in STAGE 3 of FIG. 4 with feed gas mixture FG being passed through a separation section comprising zones C and D in that order, zone A being re-pressurised with a portion RG of the product gas and zone B being depressurised and purged with purge gas PG.

At the end of STAGE 3, determined as described above for STAGES 1 and 2, freshly pressurised zone A is added to the separation section as the last zone and zone C, which formed the first zone of the separation section during STAGE 3, is removed from the separation section for depressurisation and purging so that zone D becomes the first zone.

The situation is then as shown in STAGE 4 of FIG. 4 with the feed gas mixture FG being passed through a separation section comprising zones D and A in that order, zone C being depressurised and purged and zone B being re-pressurised.

At the end of STAGE 4, again determined as described above for STAGES 1, 2 and 3, fully pressurised zone B is added to the separation section as the last zone, and zone D, which formed the first zone of the separation section during STAGE 4, is removed from the separation section for depressurisation and puring so that zone A becomes the first zone, and zone C commences re-pressurisation. The situation is then as shown in STAGE 1 of FIG. 4 and the cycle commmences all over again.

The complete cycle may be represented as follows:

| ZONE | STAGE | | | |
|---|---|---|---|---|
| | 1 | 2 | 3 | 4 |
| A | $S_1$ | D&P | RP | $S_2$ |
| B | $S_2$ | $S_1$ | D&P | RP |
| C | RP | $S_2$ | $S_1$ | D&P |
| D | D&P | RP | $S_2$ | $S_1$ | where $S_1$ and $S_2$ are the first and second beds respectively in the separation section (expressed in terms of the direction of flow of the feed gas mixture through the separation section)

D&P represents depressurisation and purging, and RP represent re-pressurisation.

The above illustration has been described for simplicity with reference to one adsorbable component in the feed gas mixture FG but the arrangement may also be used for feed gas mixtures containing three or more components two or more of which are adsorbed by the adsorbent. In this case, the signal for changing from one stage to the next may be, for example, the concentration of one of the adsorbed components reaching a predetermined value in the product stream, or the total concentration of a combination of two or more of the components reaching a predetermined value in the product stream, or the first of any of the adsorbed components to reach a predetermined concentration in the product stream for that component. Alternatively, the changeover may be effected after a predetermined time interval which, as described hereinbefore, may be calculated or determined empirically.

It will be seen from reference to FIG. 5, that where the feed gas mixture contains one adsorbable component, after each zone has spent two stages of the cycle in the separation section, initially as the final zone and subsequently as the first zone, it is almost completely saturated so that very high utilisation of the adsorbent is achieved.

Where the feed gas mixture contains two or more adsorbable components, the picture is more complicated but in each case considerably better utilization of the adsorbent in each zone is achieved than in the conventional method where use of the zone for adsorption is terminated when the concentration in the product gas of any of the adsorbable components (or a mixture of two or more thereof) reaches the predetermined maximum allowable value for that component or mixture in the product.

Figure 7:
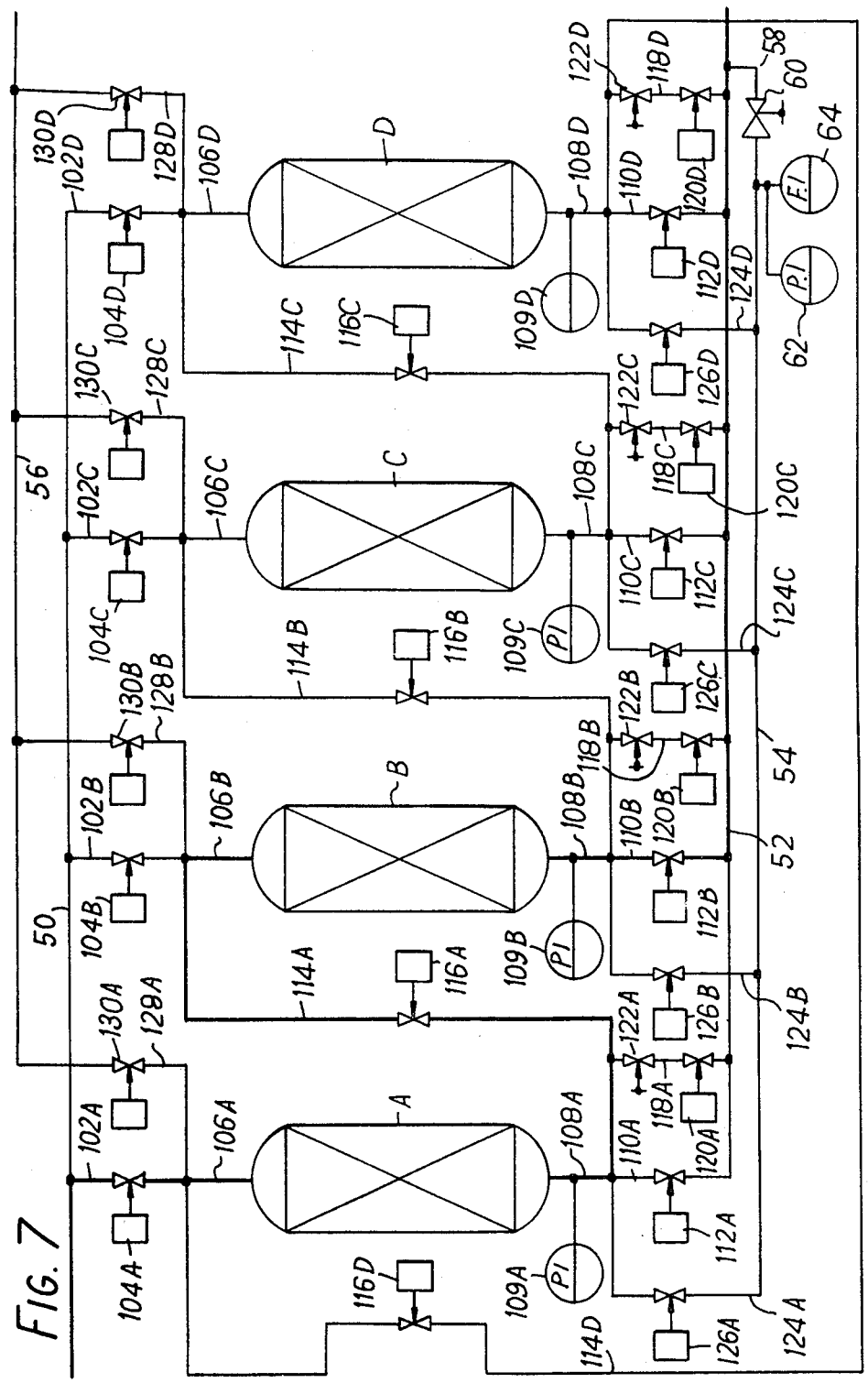
FIG. 7 shows in detail one arrangement of piping and valving the pressure swing adsorption unit of FIG. 6 to operate in accordance with the sequence illustrated in FIG. 4.

FIGS. 6 and 7 show in more detail a four-zone arrangement operating in accordance with the cycle described with reference to FIG. 4, and adapted in particular for the recovery of helium used in the inhaled gas supplied to divers operating under pressure.

Where a diver is operating at depth it is usual nowadays for his environment, including the mixture he breathes, to be raised to a pressure about equal to the water pressure at that depth. In these circumstances, it is, however, important to keep the partial pressure of the oxygen in the pressurised gas which he is inhaling to the partial pressure of the oxygen in air at atmospheric pressure. To achieve this, the air fed to the diver under pressure is diluted with inert gas and the preferred inert gas, because of its lack of side-effects, is helium. Thus, where divers are working in very deep waters, helium may form as much as 97% or even more of the inhaled gas mixture. At present, the exhaled mixture which is primarily helium but also contains oxygen, nitrogen, carbon dioxide and other gases, is usually vented to atmosphere, resulting in complete wastage of the helium.

Referring to FIG. 6, the apparatus for recovering helium from this exhaled gas comprises a buffer vessel 2, compressors 4 and 6 and a pressure swing adsorber unit generally indicated by reference numeral 8 comprising 4 zones, A, B, C and D each packed with e.g., coconut shell-activated carbon as adsorbent and each about 1 foot in diameter and 8 feet long. The contaminated helium, which has previously been reduced to about atmospheric pressure, enters the system in pipeline 10 by which it is led to the buffer vessel 2 which is kept at about atmospheric pressure, e.g., 1.1 atmospheres pressure by means of relief valve 12 and is designed to allow a gas residence time of about 30 minutes. From buffer vessel 2 it is withdrawn through pipeline 14 and compressed to the pressure required for adsorption, e.g., about 23 atmospheres absolute, by compressor 4 which is a belt driven single stage diaphragm compressor, and passed to the inlet pipe 16 of the adsorption unit 8, this pipe being fitted with a manually operated flow control valve 18 and flow indicator 20.

Purified helium leaves the adsorption unit through pipeline 22 through which it is passed to compressor 6, which is another beltdriven, single stage diaphragm compressor, for further compression to a higher pressure, e.g., 100 atmospheres, for storage. It then leaves the system through pipeline 24. Purge gas used for purging the adsorbent in the adsorption unit leaves the unit through pipeline 25.

The pressure of the feed gas stream to the adsorber unit in pipeline 16 is maintained constant by pressure indicator and control loop 26 and the pressure of the compressed purified helium in pipeline 24 is maintained constant by pressure indicator and control loop 28.

To ensure high volumetric efficiencies of the compressors 4 and 6, they are cooled by water circulating in pipelines 30, 32, 34, 36 and 38. The water is cooled in air-cooled heat exchangers 40, 42 and circulated by means of electric pump 44.

The power for the compressors is supplied by a suitable prime mover such as a diesel engine (not shown) and can suitably be transmitted by countershafts and V-belts.

FIG. 7 shows one arrangement for piping and valving the four-zone adsorber unit 8 of FIG. 6 to operate in accordance with the cycle described with reference to FIG. 4.

Referring to FIG. 7, the adsorber unit comprises the four-zones A, B, C and D, an inlet manifold 50 connected to the pipeline 16 through which contaminated helium is fed to the unit; an outlet manifold 52 connected to the pipeline 22 through which the purified helium is recovered from the unit, a purge gas manifold 54 through which purge gas is supplied to each zone and a waste gas manifold 56 whic is which to pipeline 25 from which the purge gas containing desorbed contaminants is recovered from the unit and vented. Purge gas manifold 54 is connected to outlet manifold 52 by pipeline 58 and pressure reducing valve 60, which is a manually operated needle valve. The purge gas manifold is also equipped with pressure indicator 62 and flow indicator 64.

The inlet of each zone A, B, C and D of the adsorption unit is connected to the inlet manifold by a pipeline 102A, B, C and D, respectively, containing an electrically operated solenoid valve 104 A, B, C and D, respectively, and a pipeline 106 A, B, C and D respectively, and the outlet of each zone is connected to the outlet manifold by pipelines 108 A, B, C and D and 110 A, B, C and D respectively; the pipelines 110 A, B, C and D being fitted with electrically operated solenoid valves 112 A, B, C and D, respectively and the outlet pipes 108 A, B, C and D being provided with pressure indicators 109 A, B, C and D, respectively.

The outlet pipe 108 of each zone is connected to the inlet pipe 106 of each following zone by series pipelines 114 A, B, C, and D, respectively, each fitted with an electrically operated solenoid valve 116 A, B, C and D, respectively. Each of series pipelines 114 is also connected to the outlet manifold by means of re-pressurisation gas inlet pipeline 118 (A to D) which is equipped with an electrically operated solenoid valve 120 (A to D) and a manually operable needle valve 122 (A to D).

The outlet pipe 108 of each zone is connected to the purge gas manifold 54 by purge gas inlet pipe 124 (A to D) equipped with an electrically operated solenoid valve 126 (A to D).

Finally, the inlet pipe 106 to each zone is connected to the waste gas manifold 56 by waste gas outlet pipeline 128 (A to D) equipped with an electrically operated solenoid valve 130 (A to D).

In FIG. 7, the thickened line represents the passage of helium gas through the adsorption unit, indicating that zones A and B provide the separation section. This conforms with the situation illustrated in STAGE 1 of the cycle as indicated in FIG. 4 so that zone C is being re-pressurised ready for incorporation downstream of zone B in the separation section in the next stage, and zone D is being depressurised and purged.

In this situation, solenoid operated valves 104A, 112B, 116A, 120C, 126D and 130D are open and the rest of the solenoid operated valves are closed. Contaminated helium gas mixture which has been compressed by compressor 4 is fed via pipeline 16 to inlet manifold 50 and thence via pipeline 102A, valve 104A and pipeline 106A into zone A. From zone A it passes through outlet pipe 108A, series pipeline 114A valve 116A and inlet pipe 106B into zone B. From zone B, the purified helium is withdrawn through outlet pipe 110B and valve 112B into outlet manifold 52 whence it is passed via pipeline 22 to compressor 6 for further compression for storage.

A part of the purified helium is withdrawn from outlet manifold 52 through valve 120C and pipeline 118C and thence passes along a part of series pipeline 114C into pipeline 108C and thence into zone C for re-pressurisation of that zone which will be at a lower pressure as a result of being purged in a previous stage.

Another part of the purified helium is withdrawn from outlet manifold 5 through pipeline 58 and pressure reducing valve 60 into purge gas manifold 54 and thence is passed through zone D as a purge gas at reduced pressure via purge gas inlet pipeline 124D, valve 126D and pipeline 108D. The gas stream recovered from zone D, which comprises the purge gas stream plus the material desorbed from the adsorbent in zone D, is passed via pipelines 106D and 128D and valve 130D to waste gas manifold 56 whence it is vented to atmosphere through pipeline 25.

At the point when the purity of the helium stream recovered from the adsorption unit falls to a predetermined minimum allowable value, or after the elapse of a period of time which has been calculated, or determined by empirical means, to correspond to this point, the flow of the contaminated helium stream to zone A is shut off and flow through zone C is commenced, with zone D now being re-pressurised subsequent to the depressurisation and purging of the previous stage, and zone A being subjected to depressurisation and purging. To this end, valves 104A, 112B, 116A, 120C, 126D and 130D are closed and valves 104B, 112C, 116B, 120D, 126A and 130A are opened. The cycle is then completed in the manner described with reference to FIG. 4. The positions of each of the solenoid operated valves during each of the four stages of the cycle are set out in full in the Table below.

| VALVE | STAGE | | | |
| --- | --- | --- | --- | --- |
| | 1 | 2 | 3 | 4 |
| 104A | open | closed | closed | closed |
| 104B | closed | open | closed | closed |
| 104C | closed | closed | open | closed |
| 104D | closed | closed | closed | open |
| 112A | closed | closed | closed | open |
| 112B | open | closed | closed | closed |
| 112C | closed | open | closed | closed |
| 112D | closed | closed | open | closed |
| 116A | open | closed | closed | closed |
| 116B | closed | open | closed | closed |
| 116C | closed | closed | open | closed |
| 116D | closed | closed | closed | open |
| 120A | closed | closed | open | closed |
| 120B | closed | closed | closed | open |
| 120C | open | closed | closed | closed |
| 120D | closed | open | closed | closed |
| 126A | closed | open | closed | closed |
| 126B | closed | closed | open | closed |
| 126C | closed | closed | closed | open |
| 126D | open | closed | closed | closed |
| 130A | closed | open | closed | closed |
| 130B | closed | closed | open | closed |
| 130C | closed | closed | closed | open |
| 130D | open | closed | closed | closed |

The manually operated valves 122 (A to D) are provided for the purpose of providing means for controlling the rate of repressurisation of the zones.

In the apparatus illustrated in FIG. 6, compressors are of the single diaphragm type for reasons of avoidance of contamination of the gas stream by foreign bodies, but other compressor types may be used if desired.

Suitably, the valves are operated by an electronic timing system operating on an elapsed time basis using electrically driven synchronous motors fitted with clutches, one synchronous motor being provided for each stage of the cycle. Means are provided for adjusting the timing in accordance with the feed gas mixture composition. However, other systems may be used for operating the valves. For example, means may be provided which determine the helium content of the gas leaving the adsorption unit, and initiate the operation of the valves when a predetermined minimum helium concentration is reached. Also, the valves may be operated pneumatically or mechanically rather than electrically, pneumatic means being preferred, for example, where the gas stream being treated is inflammable. Where electrical operation is chosen, the prime mover for the compressors may conveniently be arranged additionally to power an electricity generating means, e.g., an alternator, to supply the required electric power. Although coconut shell activated carbon is the preferred adsorbent, other suitable adsorbents known in the art may be used if desired.

Apparatus of the kind illustrated in FIGS. 6 and 7 and designed to purify 100 s.c.f.h. of contaminated helium to produce 99.995% pure helium delivered from the adsorption unit at 23 atmospheres and from the second compressor, 6, at 200 atmospheres, can be designed to be assembled on 2 grids, one containing the compressors, prime mover, electricity generating means (e.g. 1.5 kw alternator), water cooling system for the compressors, and buffer vessel, and the other containing the vessels containing the four adsorber zones together with the associated piping, manifolding and valving. the first mentioned grid may take up a floor area of about 5 feet by 5 feet and the second about 2 feet 6 inches by 2 feet 6 inches.

The only requirements for such an apparatus are fuel, e.g., diesel oil, for the prime mover, and water for occasional topping up of the cooling system. Thus, the whole apparatus can be conveniently accommodated on a small boat or lighter and is easily maintained. Moreover, the compressors can be used to supply other services such as compressed air for operating pneumatically powered hoists or tools, and the electricity generating means can be designed to have spare capacity e.g., to power lighting equipment. For example, in the apparatus described, the power requirements can be as little as 0.5kw so that with a 1.5kw alternator there is approximately 1kw of spare capacity available.

The apparatus described with reference to FIG. 4, 6 and 7 requires four adsorbent zones with two forming the separation section. However, other possibilities can be envisaged. Thus, in the simplest arrangement, three zones may be used with two forming the separation section and a third one being depressurised and purged in each stage of the cycle. In such an arrangement, however, it is difficult to achieve repressurisation of the third vessel prior to its reincorporation into the separation section and for the reasons given above it is therefore less preferred.

In an alternative arrangement using four zones, three may form the separation section with the fourth one being depressurised and purged but this arrangement is also less preferred for the same reason.

With five zones provided, further alternatives are possible with two, three or, less preferably, four zones forming the separation section. Where two zones form the separation section, depressurisation, purging and repressurisation may be effected in different stages of the cycle since three stages are now available between a zone completing its residence in the separation section as the first zone thereof and being re-introduced into the section as the last zone thereof. Thus, the cycle may be represented as follows, wherein $S_1$ and $S_2$ are the first and second beds in the separation section (expressed in terms of the direction of flow through the section of the feed gas mixture to be treated) D represents depressurisation, P represents purging and RP represents repressurisation:

| ZONE | STAGE | | | | |
|---|---|---|---|---|---|
| | 1 | 2 | 3 | 4 | 5 |
| 1 | $S_1$ | D | P | RP | $S_2$ |
| 2 | $S_2$ | $S_1$ | D | P | RP |
| 3 | RP | $S_2$ | $S_1$ | D | P |
| 4 | P | RP | $S_2$ | $S_1$ | D |
| 5 | D | P | RP | $S_2$ | $S_1$ |

However, where the separation section comprises three of the five zones, the arrangement for depressurisation, purging and repressurisation is preferably as illustrated in FIG. 4, i.e., with depressurisation and purging being effected in one stage and re-pressurisation being effected in another stage. This arrangement is particularly preferred where the feed gas mixture contains two components that require adsorption. With this arrangement, the cycle may be presented as follows wherein $S_1$, $S_2$ and $S_3$ are the first, second and third beds in the separation section D&P represents depressurisation and purging and RP represents repressurisation:

| ZONE | STAGE | | | | |
|---|---|---|---|---|---|
| | 1 | 2 | 3 | 4 | 5 |
| 1 | $S_1$ | D&P | RP | $S_3$ | $S_2$ |
| 2 | $S_2$ | $S_1$ | D&P | RP | $S_3$ |
| 3 | $S_3$ | $S_2$ | $S_1$ | D&P | RP |
| 4 | RP | $S_3$ | $S_2$ | $S_1$ | D&P |
| 5 | D&P | RP | $S_3$ | $S_2$ | $S_1$ |

With six zones provided in the unit, three or four zones or, less preferably, two or five zones may be incorporated in the separation section. Where two zones are provided in said section, depressurisation, purging and repressurisation may be effected in separate stages and a further stage will be available in which no treatment need be made to a zone. Such a "rest" stage is generally unnecessary and therefore wasteful in utilisation of adsorbent. The use in the separation section of all but one of the total of six zones available is also not preferred for the reasons given above.

With the use of three zones in the separation section, depressurisation, purging and repressurisation can be effected in separate stages of the cycle. Where four zones are used, however, depressurisation and purging will usually together occupy a single stage. The use of a six zone adsorption unit having four zones in the separation section may be especially desirable for the separation of gas mixtures containing three adsorbable components. With this arrangement, the cycle may be represented as follows where $S_1$, $S_2$, $S_3$ and $S_4$ are the first, second, third and fourth beds in the separation section, and D&P and RP have the meanings shown above:

| ZONE | STAGE | | | | | |
|---|---|---|---|---|---|---|
| | 1 | 2 | 3 | 4 | 5 | 6 |
| 1 | $S_1$ | D&P | RP | $S_4$ | $S_3$ | $S_2$ |
| 2 | $S_2$ | $S_1$ | D&P | RP | $S_4$ | $S_3$ |
| 3 | $S_3$ | $S_2$ | $S_1$ | D&P | RP | $S_4$ |
| 4 | $S_4$ | $S_3$ | $S_2$ | $S_1$ | D&P | RP |
| 5 | RP | $S_4$ | $S_3$ | $S_2$ | $S_1$ | D&P |
| 6 | D&P | RP | $S_4$ | $S_3$ | $S_2$ | $S_1$ |

In the adsorption units described above with reference to FIGS. 4, 6 and 7, the repressurisation of each zone subsequent to purging and prior to use in the separation section is seen to be effected using purified product gas. It is, however, possible and may be desirable to effect repressurisation with another gas supply and particularly with feed gas. It is also possible to purge with an independent source of non-adsorbable gas instead of with the purified effluent if desired. Further, although purging is shown as being effected with a purge gas flow through each adsorption zone in the reverse direction to that of the flow of feed gas during separation, purge gas flow in the same direction as feed gas flow is not excluded, particularly where the adsorbent is substantially completely saturated. However, where the adsorbent is only partially saturated, it is generally preferred for the purge gas to flow in the reverse direction to that of the feed gas.

The principal advantage of the invention is that it leads to an improved utilisation of adsorbent. Alternatively, a quantity of gas can be separated with the use of a smaller amount of adsorbent.

A further advantage of the invention is that the flow of purge gas may be reduced. This is due to the fact that, in the system of the invention, the purge gas is in contact with an adsorbed phase which has, on the average, a higher partial pressure than in conventional usage since the adsorbent is more heavily loaded with adsorbed gas. As a result, the driving force for desorption is greater and the amount of purge gas required is smaller. Consequently the recovery of purified product is greater when the beds are used according to the invention. By way of example, in the case of a hydrogen-methane mixture comprising 95.6% $H_2$ and 4.4% $CH_4$, as described above, it can be shown that the hydrogen recovery from an adsorption unit comprising four zones each 6ft long and each containing type 5A molecular sieve adsorbent and operating the cycle described with reference to the invention illustrated in FIG. 4 is approximately 14% greater than when using the usual system comprising the same mass of adsorbent in two beds each 12 feet long, one being used for the separation while the other is being purged, both systems being otherwise operated under identical conditions of pressure and temperature.

It will be understood that each zone in a multi-zone adsorption unit of the kind described may comprise one bed of adsorbent or a plurality of beds of adsorbent. However, unnecessary complications in operation are likely to be introduced if the zones are of varying overall size. It is therefore preferred that all the zones are of substantially the same effective size although each may be subdivided into a plurality of individual beds arranged in parallel and/or in series.

As has been explained above, the concentration of the or each adsorbable component in the product gas will vary through each stage of the operating cycle. In general, this variation will be small but there may be applications where even this small variation is not tolerable. An embodiment of the invention which reduces these variations is now described with reference to FIG. 8 of the drawings.

In FIG. 8, reference numeral 200 represents the separation section of the pressure swing adsorption unit, comprising two or more zones of adsorbent, 201 is the inlet pipe to the separation section, 202 is the outlet pipe from the separation section, 203 is a by-pass pipe, 204 is a flow control valve, the operation of which is controlled by signals derived from gas analyser 205 which may be, for example, a Katharometer, and 206 is the product pipe.

In operation, feed gas mixture enters the system in pipeline 201 by which it is passed to the separation section 200 of the pressure swing adsorption unit and product gas is recovered from the separation section through pipelines 202 and 206. As the gas mixture is passed through the separation section, the concentration of an adsorbable component which remains in the product gas leaving the section will rise from an initially very low, possibly undetectable, amount until it reaches a predetermined level at which in accordance with the invention a fresh zone of adsorbent is added to the separation section whereupon the concentration initially drops sharply away and subsequently commences to rise again, the cycle being repeated with each addition of a fresh zone to the separation section.

In accordance with this embodiment, a small part of the feed gas mixture is caused to by-pass the separation section through pipeline 203 and to combine with the product gas recovered from the separation section, and the rate of flow of the gas in pipeline 203 is varied by means of flow control valve 204 to produce a gas in pipeline 206 having a substantially constant composition. In the embodiment illustrated, this is effected automatically by means of gas analyser 205, which is arranged to constantly monitor the partial pressure of the adsorbable component in the gas in pipeline 206, The partial pressure determined by the gas analyser may be compared with a predetermined value and any difference between them caused to generate a signal adapted to activate the valve operating mechanism to adjust the rate of flow of gas in the pipeline 203 is a direction to cause the composition of the gas in pipeline 206 to change in a direction that alters the value of the partial pressure of the adsorbable component towards the said predetermined value.

It will be appreciated that in the practice of this embodiment, the partial pressure of the adsorbable component in the product gas recovered from the separation section of the adsorber must always be below the predetermined value with which the value recorded by the gas analyser is compared, and the adsorption unit should be adjusted to operate accordingly.

As stated hereinbefore, the most readily available, or only immediately available source of the purge gas for regenerating the adsorbent in each zone after the zone has been removed from the separation section is the product gas. In this case, a portion of the product gas is separated from the remainder, reduced to the second or purge pressure, and used as the purge gas. Such use, however, represents a net loss of product gas.

Generally, the greater the difference between the separation pressure and the purge pressure, the smaller the quantity of purge gas required but it is not normally desirable to reduce the pressure of the purge gas below atmospheric pressure because of the need to install vacuum equipment.

I have now found that the loss in product gas through the use of a portion thereof for purging may be avoided by regenerating the adsorbent in the removed zone by evacuation rather than by using a purge gas.

Accordingly, in a modification of the process of the present invention the step of regenerating the adsorbent in each zone after it has been removed from the separation section is effected by evacuation of the removed zone.

This not only avoids the loss of a part of the product gas as purge gas but also reduces the amount of product gas required for repressurisation since it has been found that evacuation effects more efficient regeneration than the use of a purge gas so that regeneration, and hence also repressurisation, are required less frequently. This saving of product gas through the reduction in frequency of repressurisation more than offsets the increase in volume of repressurisation gas that may be required per repressurisation because of any increased pressure difference between adsorption pressure and regeneration pressure as a result of regenerating by evacuation rather than the use of a purge gas at or above atmospheric pressure.

Apparatus suitable for use with this modification of the invention comprises an adsorption unit comprising a plurality of adsorption zones for adsorbing said contaminant from said gas mixture and means for regenerating adsorbent, said adsorption unit including at least three compartments for adsorbent, each having a gas inlet and a gas outlet for gas to be passed through adsorbent in he compartment, each compartment forming a separately isolatable adsorption zone, an inlet for the gas mixture to be separated in said unit, an outlet for purified gas, an inlet manifold connected to the inlet for the gas mixture, a purified gas outlet manifold connected to the outlet for the purified product, said regenerating means comprising means for evacuating the adsorption zones, first conduit means for connecting the inlet of each compartment to the inlet manifold, with an inlet valve in the conduit between each compartment inlet and the inlet manifold, second conduit means for connecting the outlet from each compartment to the purified gas manifold, with an outlet valve in the conduit between each compartment outlet and the outlet manifold, third conduit means for connecting the interior of each compartment to said evacuating means, there being a valve between each compartment interior and the evacuating means, and fourth conduit means adapted to connect the compartments together for flow of gas therethrough with the outlet of each compartment connected to the inlet of the next compartment, there being a valve in the conduit between the outlet of each compartment and the inlet of the next compartment, said valves being arranged such that at least a first and a second of said compartments are connected in series to provide a separation section between the inlet manifold and the outlet manifold for flow of gas therethrough and in that order with respect to the gas flow, and at least a third compartment is connected to said evacuating means for regeneration of the adsorbent therein, and automatic valve control means adapted periodically to switch the valves to disconnect said third compartment from said evacuating means and connect it in series with said second compartment in said separation section to form the last compartment in said section, expressed in terms of flow of gas therethrough and disconnect said first compartment from said separation section and connect it to said evacuating means for regeneration of the adsorbent therein.

It has also been observed that during the depressurisation required for regeneration of the adsorbent, irrespective of whether this regeneration is effected by evacuation or by use of a purge gas, the composition of the initial exit gas from the zone being regenerated is similar to that of the feed gas mixture fed to the zone while that zone was part of the separation section, and initially during the depressurisation remains substantially constant. It is believed that this is because during the initial stages of depressurisation, the exit gas is largely gas that has been retained in the interstitial voids in the adsorbent bed in the zone (hereinafter referred to as interstitial gas), and that very little of the contaminant adsorbed by the bed is being desorbed. Since the adsorbent in the zone is substantially saturated when the zone is removed from the separation section for regeneration, this interstitial gas will have virtually the same composition as the feed gas, and where the bed of adsorbent contains a large voidage, a substantial volume of this interstitial gas is involved. As the pressure is reduced further, however, the adsorbed material commences to be desorbed and this is reflected in a sharp rise in concentration of this material in the exit gas.

In accordance with another modification of the present invention, therefore, reclamation of this interstitial gas is effected by recycling the gas initially exiting from the zone during depressurisation to the inlet of the separation section to be passed through said separation section at substantially the adsorption pressure, said recycle being continued until not later than the occurence of a rapid increase in the concentration of adsorbable material in the exit gas.

By the "adsorption pressure" is meant the pressure at the inlet to the separation section.

Apparatus suitable for use with this modification will include a compressor having an inlet arranged to receive the gas leaving the compartment the adsorbent of which is being regenerated by purging or evacuation and a compressed gas outlet communicating with the inlet to the separation section, waste gas conduit means also arranged to receive the said gas, valve means adapted to direct said gas to the one or the other of said compressor inlet and said waste gas conduit means, and valve control means adapted to control the valve means to direct said gas initially to said compressor inlet and subsequently to divert said gas to said waste gas conduit means at or before the occurrence of a rapid increase in the concentration of contaminant in said gas.

The composition of the exit gas can be readily monitored using known gas analysis techniques, e.g., katharometry, and therefore a rapid increase in the concentration of the adsorbable material can be readily determined.

For any given gas mixture and adsorption conditions such as of temperature and pressure, this rapid increase in concentration of the adsorbable material will generally occur at or near a given value for the concentration.

Thus, in accordance with one method of carrying out the recycle process of the invention, the gas exiting from the zone during the initial stages of depressurisation may be recovered and recycled until the concentration of adsorbable material in said gas reaches a predetermined level which is not greater than the level which corresponds to the occurrence of the above-mentioned rapid increase. Preferably this predetermined level is substantially equal to the level corresponding to the rapid increase.

In apparatus for carrying out this embodiment, the valve control means suitably comprise sensor means for sensing the level of concentration of contaminant in said gas and means responsive to said sensor means to operate the valve to direct the gas to said compressor inlet when said sensed level is below a predetermined level and to direct the gas to said waste conduit means when said sensed level exceeds said predetermined level.

The pressure at which this occurs will vary depending on the nature of the material to be desorbed from the adsorber bed but experience shows that in general it will be found to be equivalent to about 15 to 30% of the total drop in pressure from the adsorption pressure to the pressure of the purge gas where a purge gas is used, or about 10 to 30% of the adsorption pressure expressed as absolute pressure where regeneration is effected by evacuation.

Thus in accordance with another method of carrying out the recycle process of the invention, the gas exiting from the zone during the initial stages of depressurisation may be recovered and recycled until its pressure falls to a predetermined pressure below the adsorption pressure.

This may be achieved for example by sensing the pressure of the gas exiting from the zone and stopping the recycling when this pressure reaches said predetermined pressure. Alternatively, the recycling may be stopped after the elapse of a period of time after commencement of depressurisation which is known, e.g., from trial and experiment or from calculation, to correspond to said pressure.

In apparatus for use with the first alternative, the valve control means may suitably comprise sensor means for sensing the pressure of said gas and means responsive to said sensor means to operate the valve to direct the gas to said compressor inlet when said sensed pressure exceeds a predetermined level and to direct the gas to said waste conduit means when said sensed level is below said predetermined level.

In apparatus for use with the second alternative, the valve control means may suitably comprise timing means adapted to operate said valve to divert the gas from said compressor inlet to said waste conduit means at a predetermined time after the commencement of evacuation of said third compartment.

The pressure of the gas that is recycled to the separation section is restored to the adsorption pressure by means of the compressor. The same compressor may also be used to compress the feed gas mixture to the adsorption pressure where such compression is required.

Figure 11:
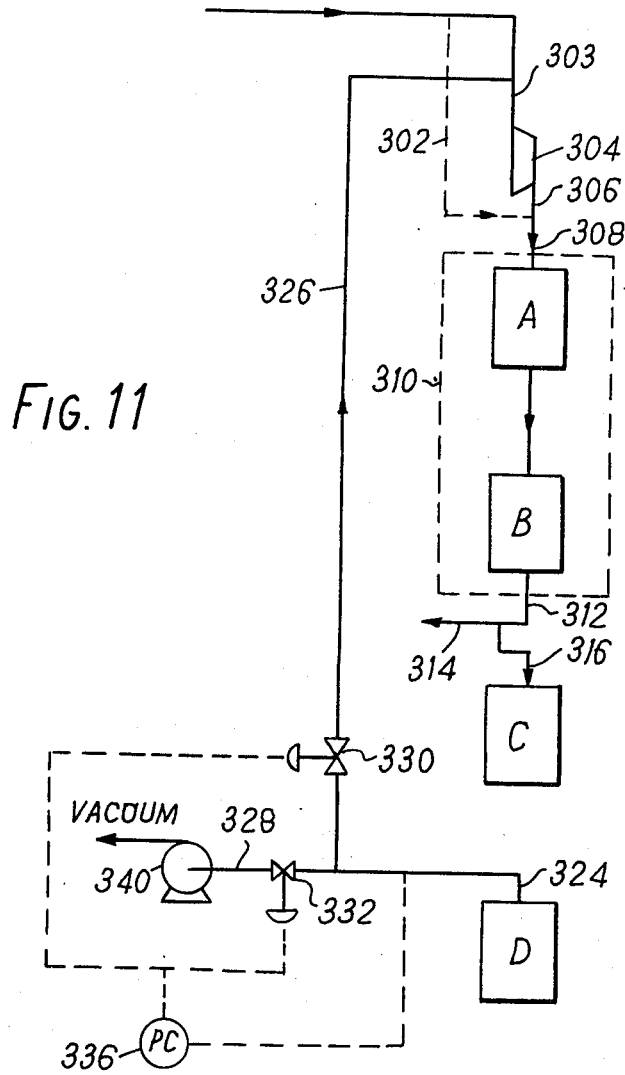
FIG. 11 shows a modification of the four-zone arrangement of FIG. 9 wherein provision is made for recycling gas recovered from each zone during evacuation of the zone.

The use of evacuation to regenerate the adsorbent and the recycling of the interstitial gas to the separation section are illustrated by means of the following Example and with the aid of the accompanying drawings in which:

FIG. 9 is a schematic flow sheet of a modification of the four zone pressure swing adsorption unit illustrated in FIG. 4 when in the mode identified as STAGE 1 in FIG. 4, and wherein regeneration of the adsorbent is effected by evacuation in place of purging;

FIG. 10 is a schematic flow sheet of another modification of the four zone pressure swing adsorption unit illustrated in FIG. 4, again when in the mode identified as STAGE 1 in FIG. 4, wherein provision is made for recycle of the interstitial gas recovered during depressurisation; and FIG. 11 is a schematic flow sheet of a modification of the apparatus of FIG. 9 wherein provision is made for recycle of the interstitial gas recovered during depressurisation.

In the arrangement illustrated in FIG. 4 of the drawings, it will be recalled that in the period of the cycle illustrated in STAGE 1, feed gas for separation (FG) is fed at elevated pressure to the inlet of the separation section of the pressure swing absorber, consisting of adsorber zones A and B connected in series, where adsorbable contaminant is removed from the feed gas by adsorption. Product gas substantially free of the adsorbable material leaves the separation section from the outlet of zone B and is divided into three portions. A first portion is recovered as product gas (PE). A second portion (RG) is fed to adsorber zone C to repressurise this zone to adsorption pressure. A third portion (PG) is fed to expansion valve V where its pressure is reduced, and is then passed at reduced pressure to adsorber zone D as purge gas. The gas (DG) exiting from the adsorber zone D is waste gas and is vented to atmosphere or flared.

Referring now to the arrangement illustrated in FIG. 9, the adsorber illustrated differs from that of FIG. 4 in that the regeneration is effected by evacuation, no purge gas being used. Thus, in the arrangement illustrated in FIG. 9, the feed gas for separation is fed at elevated pressure in pipeline 302 (or is fed in pipeline 303 to be compressed to elevated pressure in compressor 304 and fed via pipeline 306) to pipeline 308 leading to the inlet of the separation section 310 of the adsorber, consisting, as before, of zones A and B connected in series. Product gas substantially free of the adsorbable material leaves the separation section in pipeline 312 but in this case it is divided into two portions only, one of which is recovered in pipeline 314 as product, and the other of which is fed via pipeline 316 to zone C to repressurise this zone to adsorption pressure. Zone D is undergoing regeneration by evacuation through piplines 324 and 328 by means of vacuum pump 340. The evacuated material is passed for venting or flaring.

The cycle of operation of the apparatus corresponds to that of the apparatus shown in FIG. 4.

FIG. 10, in which the features which are common with FIG. 9 have the same reference numerals or letters, is again a flow sheet of a four zone adsorber which operates with the same cycle as that illustrated in FIG. 4 and is shown in the period of the cycle corresponding to STAGE 1 in FIG. 4. As in FIG. 4, the prodduct gas leaving the separation zone is divided into three portions. The first portion is recovered through pipeline 314 as product gas. The second portion is fed via pipeline 316 to adsorber zone C to repressurise this zone to adsorption pressure. A third portion is fed via pipeline 318 to expansion valve 320 where its pressure is reduced, and is then passed to adsorber zone D as purge gas. In the adsorber of FIG. 10, however, provision is made for recycling the gas exiting from zone D, which is undergoing depressurisation and purging, to the separation section inlet. Thus, pipeline 324 is connected to two pipelines, 326 and 328, each of which is fitted with a valve, 330, 332 respectively. Pipeline 326 connects pipeline 324 to pipeline 303 and the inlet to compressor 304. Pipeline 328 connects pipeline 324 to the flare or vent to atmosphere. A pressure sensing device 334 is located in pipeline 324 to sense the pressure of the gas therein and is connected to a valve control means 336 in the form of a pressure controller which is adapted to control valves 330 and 332. The controller is adapted so that in operation it closes valve 330 and opens valve 332 when the sensed pressure of the gas in pipeline 324 falls below a predetermined level, the positions of these valves being reversed when the sensed pressure of the gas in pipeline 324 is above that level. In operation, the pressure controller is arranged so that it operates to close valve 330 and open valve 332 at a pressure which is at or slightly above the pressure at which the absorbed contaminant commences to be desorbed from the adsorbent in zone D, resulting in a rapid increase in the concentration of contaminant in the gas in pipeline 24.

FIG. 11, in which the features common with FIGS. 9 and 10 have the same reference numerals or letters, is a flow sheet of the four zone adsorber of FIG. 9 but modified, as in the adsorber of FIG. 10, to provide for recycling of gas exiting from the zone D to the separation section inlet.

EXAMPLE

A. In a first experiment, a feed gas mixture consisting of 94 mol % He and 6 mol % of adsorbable impurities was separated using the adsorber arrangement of FIG. 4 using coconut shell activated carbon as the adsorbent.

The pressue in the separation section was 350 psig, the length of each period of the cycle was 10 minutes, and the purge gas pressure was 5 psig.

With a feed gas rate of 149.5 SCFH the total product recovered from the separation section was 140.5 SCFH of 99.995% pure helium of which 15 SCFH was used as purge gas and 40.5 SCFH was required for repressurisation since each zone required 6.75 SCF of gas for repressurisation to 350 psig and six zones required repressurisation each hour.

Thus, the hourly recovery of helium was $$[140.5 - (15 + 40.5)] \times 0.99995$$

and the yield of helium, expressed as percentage of theoretical was $$\frac{[140.5 - (15 + 40.5)] \times 0.99995}{149.5 \times 0.94} = 60.5\%$$

B. In a second experiment, the same feed gas mixture was separated in the adsorber of FIG. 9 using the same volume of the same absorbent as in the first experiment, to produce a product gas of the same 99.995% purity.

It was found that using the same adsorption pressure of 350 psig and the same rate of feed of 149.5 SCFH, as a result of the increased efficiency of regeneration by use of vacuum rather than purging, the length of each period of the cycle could be increased safely to about 15 minutes duration so that only 4 zones required regeneration in each hour instead of 6. However, as it was now necessary to repressurise each zone from vacuum to 350 psig, the quantity of product gas required to repressurise each zone was found to have increased to 7.05 SCF. On the other hand, no product gas was lost as purge gas.

Thus, the yield of He was $$\frac{0.99995 [140.5 - (4 \times 7.05)]}{149.5 \times 0.94} = 80\%$$

C. In a third experiment, the same feed gas mixture was separated in the adsorber of FIG. 10 using the same volume of the same adsorbent as in the first experiment, to produce a product gas of the same 99.995% purity.

The pressure controller 336 of FIG. 10 was set to close valve 330 in each period after the pressure of the gas exiting from the zone undergoing regeneration had dropped to 50 psig.

The pressure and total rate of feed of the gas mixture to the separation section were maintained the same as the first experiment at 350 psig and 149.5 SCFH, as were the purge gas pressure (5 psig) and the length of each period of the cycle (10 minutes).

Since the adsorption and purge gas pressures were the same as for Experiment A, the volume of gas required to repressurise each zone remained the same at 6.75 SCF.

It was found that under these conditions 5.55 SCF of interstitial gas was recovered and recycled from each zone during depressurisation.

Thus, the net flow of fresh feed to the absorber was $149.5 - (6 \times 5.55) = 116.2$ SCFH.

The yield of He was thus $$\frac{[140.5 - (15 + 40.5)] \times 0.99995}{116.2 \times 0.94} = 78\%$$

D. In the fourth experiment, the same feed gas mixture was separated in the adsorber of FIG. 11 using the same volume of the same adsorbent as in all the other experiments, again to produce a product gas of 99.995% purity. Total feed rate to the separator section was 149.5 SCFH at 350 psig.

Since, as in the second experiment, regeneration was effected by evacuation, there was no purge gas stream and, as in said second experiment, each period could be safely extended to 15 minutes duration. Again, as in the second experiment, since repressurisation had to be effected from vacuum, 7.05 SCF of gas was required to repressurise each zone.

The pressure controller 336 was set so that in each period the valve 330 closed and valve 332 opened after 5.2875 SCF of interstitial gas had been recovered and recycled from each zone during evacuation.

Thus the net flow of fresh feed to the adsorber is $$[149.5 - (4 \times 5.2875)] = 128.35 \text{ SCFH}.$$

The net product flow is $140.5 - (4 \times 7.05 \times 0.99995) = 112.3$ SCFH.

Thus, the yield of He is $112.3/128.35 = 87.5\%$

What is claimed is:

1. A method of separating a purified gas from a mixture thereof with at least one gaseous contaminant by pressure swing adsorption, said method comprising the steps of
   a. providing an adsorption unit comprising $x$ zones of adsorbent material which selectively adsorbs said gaseous contaminant, $x$ being a whole number of at least three;
   b. passing the gas mixture at a first pressure through $y$ of the zones of said adsorption unit arranged in series with respect to the flow of the gas mixture therethrough, $y$ being a whole number of from 2 to $x - 1$ and said $y$ zones constituting a separation section of said adsorption unit;
   c. recovering from the last zone of said separation section a purified gas in which the concentration of the contaminant does not exceed a predetermined value which is below the concentration of contaminant in the gas mixture;
   d. before the concentration of the contaminant in said purified gas rises above said predetermined value, but after the concentration of said contaminant in the gas stream leaving the zone forming the penultimate zone of said separation section has exceeded said predetermined value, adding another zone of said adsorption unit to the end of said separation section, expressed in terms of the direction of flow of said gas mixture through the separation section whereby said added zone now forms the last zone of said separation section;
   e. removing from said separation section the zone forming the first zone of the section whereby the zone next to it in the separation section now becomes the first zone;
   f. purging the adsorbent in said removed zone of adsorbed material by passing a purge gas through it at a second pressure which is lower than the first pressure whereby to prepare said zone for re-use in the adsorption section commencing as the last zone of said section; and
   g. periodically repeating steps (d), (e) and (f) whereby each zone of said unit is in successive periods incorporated into the separation section as the last zone thereof, subsequently periodically progressed along said section until it becomes the first zone thereof, and then purged ready for reincorporation into the separation section in a subsequent period.

2. A method as claim in claim 1 in which $x$ is at least 4 and $y$ equals $x-2$, and in which each zone is subjected to a separate step of repressurisation subsequent to the purging step but before being incorporated into the separation section.

3. A method as claimed in claim 2 in which steps (d) and (e) are operated simulataneously.

4. A method as claimed in claim 2 in which substantially equal periods of time are allowed for the step of purging and the step of repressurisation.

5. A method as claimed in claim 2 in which $x$ equals 4.

6. A method as claimed in claim 1 in which $x$ is at least 5 and $y$ equals $x-3$, and in which each zone is subjected to separate steps of depressurisation after being removed from the separation section and prior to the purging step, and of repressurisation subsequent to the purging step and before being incorporated into the separation section.

7. A method as claimed in claim 1 in which the purge gas is provided by a portion of the purified gas at reduced pressure.

8. A method as claimed in claim 1 which further includes causing a part of the gas mixture to by-pass the separation section and thereafter combining said part with the purified gas recovered from said separation section to form a combined gas stream, and controlling the flow rate of said part relative to the flow of the purified gas from said separation section so as to maintain the composition of the combined stream constant.

9. A method as claimed in claim 1 for the recovery of helium from helium-containing gas exhaled by divers inhaling a helium-diluted air composition under pressure.

10. A method as claimed in claim 9 in which the adsorbent is coconut shell-activated carbon.

11. A method as claimed in claim 9 in which the exhaled helium-containing gas is passed to a buffer vessel and thereafter compressed to a first elevated pressure and passed at said elevated pressure to the adsorption unit, and the purified helium recovered from thee adsorption unit is further compressed to a second elevated pressure for subsequent recirculation for inhalation.

12. Apparatus for separating a purified gas from a mixture thereof with at least one gaseous contaminant, said apparatus comprising a pressure swing adsorption unit comprising a plurality of adsorption zones for adsorbing said contaminant from said mixture and means for purging adsorbent of adsorbed contaminant, said adsorption unit including
   at least four compartments for adsorbent, each having a gas inlet and a gas outlet for gas to be passed through adsorbent in the compartment, each compartment forming a separately isolatable adsorption zone,
   an inlet for the gas mixtures to be separated in said unit.
   an outlet for purified gas,
   an inlet manifold connected to the inlet for the gas mixture,
   a purified gas outlet manifold connected to the outlet for the purified product,
   said means for purging adsorbent comprising a purge gas manifold,
   a waste gas manifold,
   first conduit means for connecting the inlet of each compartment to the inlet manifold, with an inlet valve in the conduit between each compartment inlet and the inlet manifold,
   second conduit means for connecting the outlet from each compartment to the purified gas manifold, with an outlet valve in the conduit between each compartment outlet and the outlet manifold,
   third conduit means for connecting the purge gas manifold to the outlet from each compartment, with a purge gas inlet valve in the conduit between each compartment outlet and the purge gas manifold,
   fourth conduit means for connecting the inlet to each compartment to the waste gas manifold, there being a waste gas outlet valve between each compartment inlet and the waste gas manifold, and
   fifth conduit means adapted to connect the compartments together for flow of gas therethrough with the outlet of each compartment connected to the inlet of the next compartment, there being a valve in the conduit between the outlet of each compartment and the inlet of the next compartment, said valves being arranged such that at least a first and a second of said compartments are connected in series to provide a separation section between the inlet manifold and the outlet manifold for flow of gas therethrough and in that order with respect to the gas flow, at least a third compartment is connected to the outlet manifold for repressurisation and at least a fourth compartment is connected for gas flow therethrough from the purge gas manifold to the waste gas manifold for purging, and automatic valve control means adapted periodically to switch the valves to connect said third compartment in series with said second compartment in said separation section to form the last compartment in said section, expressed in terms of flow of gas therethrough, disconnect said fourth compartment from said purge gas manifold and said waste gas manifold and connect it to said outlet manifold for repressurisation, and disconnect said first compartment from said separation section and connect it between the purge gas manifold and the waste gas manifold for purging.

13. Apparatus as claimed in claim 12 in which the valves are electrically operated solenoid valves.

14. Apparatus as claimed in claim 12 including electronic timing means for controlling the operation of the valves.

15. Apparatus as claimed in claim 12 further including means for compressing feed gas to be supplied to the unit, means for compressing product gas recovered from the unit, and prime mover means connected to each of said compressing means for driving same, and means drivably connected to said prime mover means for powering the operation of the pressure swing adsorption unit.

16. Apparatus as claimed in claim 15 further including means for cooling each of the compressing means, said cooling means including means drivably connected to said prime mover means for circulating a cooling medium through said compressing means.

17. Apparatus as claimed in claim 15 further including a buffer vessel adapted to store gas mixture for feeding to the first-mentioned compressor means.

18. Apparatus as claimed in claim 15 arranged in two packs, the first comprising the pressure swing adsorption unit and the second comprising the two compressing means, the prime mover means and the means for powering the operation of the pressure swing adsorption unit.

19. Apparatus as claimed in claim 15 applied to the recovery of helium from helium-containing gas exhaled by divers inhaling a helium-diluted air composition under pressure.

20. Apparatus as claimed in claim 12 further including conduit means connecting said outlet manifold with said purge gas manifold, said conduit means including a pressure reducing valve whereby a portion of said purified gas in said outlet manifold is passed at reduced pressure as purge gas to said purge gas manifold.

21. Apparatus as claimed in claim 20 in which said adsorption unit contains four compartments.

22. Apparatus for separating a purified gas from a mixture thereof with at least one gaseous contaminant, said apparatus comprising a pressure swing adsorption unit comprising a plurality of adsorption zones for adsorbing said contaminant from said mixture and means for purging adsorbent of adsorbed contaminant, said adsorption unit including at least three compartments for adsorbent, each having a gas inlet and a gas outlet for gas to be passed through adsorbent in the compartment, each compartment forming a separately isolatable adsorption zone, an inlet for the gas mixture to be separated in said unit, an outlet for purified gas, an inlet manifold connected to the inlet for the gas mixture, a purified gas outlet manifold connected to the outlet for the purified product, a purge gas manifold, a waste gas manifold, first conduit means for connecting the inlet of each compartment to the inlet manifold, with an inlet valve in the conduit between each compartment inlet and the inlet manifold, second conduit means for connecting the outlet from each compartment to the purified gas manifold, with an outlet valve in the conduit between each compartment outlet and the outlet manifold, third conduit means for connecting the purge gas manifold to the outlet from each compartment, with a purge gas inlet valve in the conduit between each compartment outlet and the purge gas manifold, fourth conduit means for connecting the inlet to each compartment to the waste gas manifold, there being a waste gas outlet valve between each compartment inlet and the waste gas manifold, and fifth conduit means adapted to connect the compartments together for flow of gas therethrough with the outlet of each compartment connected to the inlet compartment, there being a valve in the conduit between the outlet of each compartment and the inlet of the next compartment, said valves being arranged such that at least a first and a second of said compartments are connected in series to provide a separation section between the inlet manifold and the outlet manifold for flow of gas therethrough and in that order with respect to the gas flow, and at least a third compartment is connected for gas flow therethrough from the purge gas manifold to the waste gas manifold for purging, and automatic valve control means adatped periodically to switch the valves to disconnect said third compartment from said purge gas manifold and said waste gas manifold and connect it in series with said second compartment in said separation section to form the last compartment in said section, expressed in termes of flow of gas therethrough and disconnect said first compartment from said separation section and connect it between the purge gas manifold and the waste gas manifold for purging.

23. Apparatus as claimed in claim 22 and further including gas compressor means having a gas inlet communicating with the outlet of said waste gas manifold and a compressed gas outlet communicating with the inlet to said separation section, waste gas conduit means means adapted to direct gas recovered from said third compartment to the one or the other of said waste gas conduit means and said compressor inlet and valve control means adapted to control the valve means to direct the gas recovered from said third compartment initially to said compressor inlet and subsequently to divert said gas to said waste gas conduit means at or before the occurrence of a rapid increase in the concentration of contaminant in said gas.

24. Apparatus as claimed in claim 23 wherein said valve control means comprise sensor means for sensing the level of concentration of contaminant in said gas recovered from said third compartment and means responsive to said sensor means to operate the valve to direct said gas to said compressor inlet when said sensed level is below a predetermined level and to direct said gas to said waste conduit means when said sensed level exceeds said predetermined level.

25. Apparatus as claimed in claim 23 wherein said valve control means comprise sensor means for sensing the pressure fo said gas recovered from said third compartment and means responsive to said sensor means to operate the valve to direct said gas to said compressor inlet when said sensed pressure exceeds a predetermined level and to direct said gas to said waste conduit means when said sensed level is below said predetermined level.

26. Apparatus as claimed in claim 23 wherein said valve control means comprises timing means adapted to operate said valve to divert said gas recovered from said third compartment from said compressor inlet to said waste conduit means at a predetermined time after the commencement of evacuation of said third compartment.

27. A method of separating a purified gas from a mixture thereof with at least one gaseous contaminant, said method comprising the steps of
  a. providing an adsorption unit comprising $x$ zones of adsorbent material which selectively adsorbs said gaseous contaminant, $x$ being a whole number of at least three;
  b. passing the gas mixture at a first pressure through $y$ of the zones of said adsorption unit arranged in series with respect to the flow of the gas mixture therethrough, $y$ being a whole number of from 2 to $x - 1$ and said $y$ zones constituting a separation section of said adsorption unit;
  c. recovering from the last zone of said separation section a purified gas in which the concentration of the contaminant does not exceed a predetermined value which is below the concentration of contaminant in the gas mixture;
  d. before the concentration of the contaminant in said purified gas rises above said predetermined value, but after the concentration of said contaminant in the gas stream leaving the zone forming the penultimate zone of said separation section has exceeded said predetermined value, adding another zone of said adsorption unit to the end of said separation section, expressed in terms of the direction of flow of said gas mixture through the separation section whereby said added zone now forms the last zone of said separation section;
  e. removing from said separation section the zone forming the first zone of the section whereby the zone next to it in the separation section now becomes the first zone;
  f. regenerating the adsorbent in said removed zone by evacuation of said zone;
  g. periodically repeating steps (d), (e) and (f) whereby each zone of said unit is in successive periods incorporated into the separation section as the last zone thereof, subsequently periodically progressed along said section until it becomes the first zone thereof, and then treated to regenerate the adsorbent therein ready for re-incorporation into the separation section in a subsequent period.

28. A method as claimed in claim 27 further including the step of recycling the gas initially exiting from said removed zone during the evacuation procedure of step (f) to the inlet of the separation section to be passed therethrough at substantially said first pressure, said recycle being continued until not later than the occurrence of a rapid increase in concentration of said contaminant in said exit gas.

29. A method as claimed in claim 28 which includes sensing the level of concentration of said contaminant in said exit gas and terminating the recycle of said exit gas when the level of contaminant rises to a predetermined level which is not greater than that width corresponds to the occurrence of said rapid increase.

30. A method as claimed in claim 27 which includes sensing the pressure of said exit gas and terminating the recycle of said exit gas when said pressure drops to a predetermined pressure which is not lower than the pressure at which said rapid increase in concentration of contaminant occurs.

31. A method as claimed in claim 27 in which said recycle is terminated at the end of a predetermined timer interval after the commencement of the evacuation procedure of step (f), the length of said time interval being at most the length of the time interval at which said rapid increase of concentration of contaminant occurs.

32. A method of separating a purified gas from a mixture thereof with at least one gaseous contaminant by pressure swing adsorption, said method comprising the steps of
  a. providing an adsorption unit comprising $x$ zones of adsorbent material which selectively adsorbs said gaseous contaminant, $x$ being a whole number of at least three;
  b. passing the gas mixture at a first pressure through $y$ of the zones of said adsorption unit arranged in series with respect to the flow of the gas mixture therethrough, $y$ being a whole number of from 2 to $x - 1$ and said $y$ zones constituting a separation section of said adsorption unit;
  c. recovering from the last zone of said separation section a purified gas in which the concentration of the contaminant does not exceed a predetermined value which is below the concentration of contaminant in the gas mixture;
  d. before the concentration of the contaminant in said purified gas rises above said predetermined value, but after the concentration of said contaminant in the gas stream leaving the zone forming the penultimate zone of said separation section has exceeded said predetermined value, adding another zone of said adsorption unit to the end of said separation section, expressed in terms of the direction of flow of said gas mixture through the separation section whereby said added zone now forms the last zone of said separation section;
  e. removing from said separation section the zone forming the first zone of the section whereby the zone next to it in the separation section now becomes the first zone;
  f. reducing the pressure in said removed zone and purging the adsorbent in said removed zone of adsorbed material by passing a purge gas through it at a second pressure which is lower than the first pressure whereby to prepare said zone for re-use in the adsorption section commencing as the last zone of said section;

g. periodically repeating steps (d), (e) and (f) whereby each zone of said unit is in successive periods incorporated into the separation section as the last zone thereof, subsequently periodically progressed along said section until it becomes the first zone thereof, and then purged ready for re-incorporation into the separation section in a subsequent period; and h. recycling the gas initially exiting from said removed zone during the step of reducing the pressure in said zone to the inlet of the separation section to be passed therethrough at substantially said first pressure, said recycle being continued until not later than the occurrence of a rapid increase in concentration of said contaminant in said exit gas.

33. A method as claimed in claim 32 which includes sensing the level of concentration of said contaminant in said exit gas and terminating the recycle of said exit gas when the level of contaminant rises to a predetermined level which is not greater than that which corresponds to the occurrence of said rapid increase.

34. A method as claimed in claim 32 which includes sensing the pressure of said exit gas and terminating the recycle of said exit gas when said pressure drops to a predetermined pressure which is not lower than the pressure at which said rapid increase in concentration of contaminant occurs.

35. A method as claimed in claim 32 in which said recycle is terminated at the end of a predetermined time interval after the commencement of the evacuation procedure of step (f), the length of said time interval being at most the length of the time interval at which said rapid increase of concentration of contaminant occurs.

36. Apparatus for separating a purified gas from a mixture thereof with at least one gaseous contaminant, said apparatus comprising an adsorption unit comprising a plurality of adsorption zones for adsorbing said contaminant from said mixture and means for regenerating adsorbent, said adsorption unit including at least three compartments for adsorbent, each having a gas inlet and a gas outlet for gas to be passed through adsorbent in the compartment, each compartment forming a separately isolatable adsorption zone, an inlet for the gas mixture to be separated in said unit, an outlet for purified gas, an inlet manifold connected to the inlet for the gas mixture, a purified gas outlet manifold connected to the outlet for the purified product, said regenerating means comprising means for evacuating the adsorption zones, first conduit means for connecting the inlet of each compartment to the inlet manifold, with an inlet valve in the conduit between each compartment inlet and the inlet manifold, second conduit means for connecting the outlet from each compartment to the purified gas manifold, with an outlet valve in the conduit between each compartment outlet and the outlet manifold, third conduit means for connecting the interior of each compartment to said evacuating means, there being a valve between each compartment interior and the evacuating means, and fourth conduit means adapted to connect the compartments together for flow of gas therethrough with the outlet of each compartment connected to the inlet of the next compartment, there being a valve in the conduit between the outlet of each compartment and the inlet of the next compartment, said valves being arranged such that at least a first and a second of said compartments are connected in series to provide a separation section between the inlet manifold and the outlet manifold for flow of gas therethrough and in that order with respect to the gas flow, and at least a third compartment is connected to said evacuating means for regeneration of the adsorbent therein, and automatic valve control means adapted periodically to switch the valves to disconnect said third compartment from said evacuating means and connect it in series with said second compartment in said separation section to form the last compartment in said section, expressed in terms of flow of gas therethrough and disconnect said first compartment from said separation section and connect it to said evacuating means for regeneration of the adsorbent therein.

37. Apparatus as claimed in claim 36 further including gas compressor means having a gas inlet communicating with the gas exhaust of said evacuating means and a compressed gas outlet communicating with the inlet to said separation section, waste gas conduit means also communicating with said gas exhaust, valve means adapted to direct gas evacuated from said third compartment by said evacuating means to the one or the other of said compressor inlet and said waste gas conduit means and valve control means adapted to control the valve means to direct the gas initially to said compressor inlet and subsequently to divert the gas to said waste gas conduit means at or before the occurrence of a rapid increase in the concentration of contaminant in said gas.

38. Apparatus as claimed in claim 37 wherein said valve control means comprise sensor means for sensing the level of concentration of contaminant in said gas and means responsive to said sensor means to operate the valve to direct the gas to said compressor inlet when said sensed level is below a predetermined level and to direct the gas to said waste conduit means when said sensed level exceeds said predetermined level.

39. Apparatus as claimed in claim 37 wherein said valve control means comprise sensor means for sensing the pressure of said gas and means responsive to said sensor means to operate the valve to direct the gas to said compressor inlet when said sensed pressure exceeds a predetermined level and to direct the gas to said waste conduit means when said sensed level is below said predetermined level.

40. Apparatus as claimed in claim 37 wherein said valve control means comprises timing means adapted to operate said valve to divert the gas from said compressor inlet to said waste conduit means at a predetermined time after the commencement of evacuation of said third compartment.

* * * * *

UNITED STATES PATENT OFFICE
CERTIFICATE OF CORRECTION

Patent No. 3,944,400    Dated March 16, 1976

Inventor(s) Graham Bird    Page 1 of 2

It is certified that error appears in the above-identified patent and that said Letters Patent are hereby corrected as shown below:

Column 4, line 53: Change "and" to --an--.
line 54: Change "an" (1st occurrence) to --in--.
Column 6, line 4: Change "first" to --further--.
Column 7, line 17: Delete "is".

Column 8, line 26: Change "witin" to --within--.

Column 13, line 12: Change "whic" to --which--; change "which" to --connected--.

Column 14, line 10: Change "5" to --52--.

Column 18, line 44: Change "is" to --in--.

Column 19, line 32: Change "he" to --the--.

Column 22, line 64: Change "prodduct" to --product--.

Column 26, line 23: Change "thee" to --the--.

Column 28, line 54: Change "termes" to --terms--

Column 30, line 27: Change "timer" to --time--.

Column 28, line 44: Change "adatped" to --adapted--.

line 64: After "means" (1st occurrence) add --also communicating with said second waste gas manifold, valve--.

UNITED STATES PATENT OFFICE
CERTIFICATE OF CORRECTION

Patent No. 3,944,400     Dated March 16, 1976

Inventor(s) Graham Bird     Page 2 of 2

It is certified that error appears in the above-identified patent and that said Letters Patent are hereby corrected as shown below:

Column 29, line 16: Change "fo" to --of--.

Column 30, line 17: Change "width" to --which--.

Signed and Sealed this

Seventh Day of September 1976

[SEAL]

Attest:

RUTH C. MASON
*Attesting Officer*

C. MARSHALL DANN
*Commissioner of Patents and Trademarks*